United States Patent
Mase et al.

(10) Patent No.: US 9,707,515 B2
(45) Date of Patent: *Jul. 18, 2017

(54) HONEYCOMB STRUCTURE

(71) Applicant: NGK Insulators, Ltd., Nagoya (JP)

(72) Inventors: Kazumi Mase, Nagoya (JP); Yoshiyuki Kasai, Nagoya (JP); Masahiro Tokuda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 275 days.

This patent is subject to a terminal disclaimer.

(21) Appl. No.: 14/496,738

(22) Filed: Sep. 25, 2014

(65) Prior Publication Data
US 2015/0030510 A1    Jan. 29, 2015

Related U.S. Application Data

(63) Continuation of application No. PCT/JP2013/059145, filed on Mar. 27, 2013.

(30) Foreign Application Priority Data

Mar. 30, 2012 (JP) ................................. 2012-081840

(51) Int. Cl.
*B01D 50/00* (2006.01)
*B01D 39/00* (2006.01)
(Continued)

(52) U.S. Cl.
CPC .......... *B01D 53/8678* (2013.01); *B01J 35/04* (2013.01); *F01N 3/0222* (2013.01);
(Continued)

(58) Field of Classification Search
CPC .. F01N 3/027; F01N 2240/16; B01D 46/0057
See application file for complete search history.

(56) References Cited

U.S. PATENT DOCUMENTS 5,063,029 A    11/1991    Mizuno et al.
5,288,975 A    2/1994    Kondo
(Continued)

FOREIGN PATENT DOCUMENTS

EP    0 465 237 A2    1/1992
JP    03-295184 A1    12/1991
(Continued)

OTHER PUBLICATIONS

Extended European Search Report (Application No. 13767695.3) dated Nov. 10, 2015.
(Continued)

*Primary Examiner* — Amber R Orlando
(74) *Attorney, Agent, or Firm* — Burr & Brown, PLLC

(57) ABSTRACT

A honeycomb structure of the present invention includes a honeycomb structure body and a pair of electrode member arranged at a side surface of the honeycomb structure body. The honeycomb structure body has an electrical resistivity of 1 to 200 Ωcm, and the respective pair of electrode members is formed into a band-like shape extending in a direction in which the cells extend. In a cross section perpendicular to the cell extending direction, one of the electrode members is arranged opposite to another of the electrode members sandwiching a center of the honeycomb structure body. One or more of slits, which being open to a side surface, are formed at the honeycomb structure body. At least the one slit is formed so as not to intersect with a straight line connecting center portions of the respective pair of electrode members in the cross section perpendicular to the cell extending direction.

15 Claims, 9 Drawing Sheets

(51) Int. Cl.
  B01D 41/00 (2006.01)
  B01D 45/00 (2006.01)
  B01D 46/00 (2006.01)
  B01D 49/00 (2006.01)
  B01D 51/00 (2006.01)
  B01D 53/86 (2006.01)
  B01J 35/04 (2006.01)
  F01N 3/28 (2006.01)
  F01N 3/022 (2006.01)
  F01N 3/20 (2006.01)
  F01N 3/027 (2006.01)
  B01J 35/00 (2006.01)

(52) U.S. Cl.
  CPC ......... *F01N 3/2026* (2013.01); *F01N 3/2828* (2013.01); *B01D 2255/806* (2013.01); *B01D 2255/90* (2013.01); *B01J 35/0033* (2013.01); *F01N 3/027* (2013.01); *F01N 2240/16* (2013.01); *F01N 2260/10* (2013.01); *F01N 2330/06* (2013.01); *Y02T 10/26* (2013.01)

(56) References Cited

U.S. PATENT DOCUMENTS

| | | |
|---|---|---|
| 5,463,206 A | 10/1995 | Abe et al. |
| RE35,134 E | 12/1995 | Mizuno et al. |
| 5,514,347 A | 5/1996 | Ohashi et al. |
| 5,852,285 A | 12/1998 | Kato et al. |
| 9,506,391 B2 * | 11/2016 | Mase ............... F01N 3/2828 |
| 2003/0134084 A1 | 7/2003 | Ichikawa et al. |
| 2003/0140608 A1 | 7/2003 | Hamanaka et al. |
| 2012/0076699 A1 | 3/2012 | Ishihara |

FOREIGN PATENT DOCUMENTS

| | | |
|---|---|---|
| JP | 05-144549 A1 | 6/1993 |
| JP | 08-218857 A1 | 8/1996 |
| JP | 09-088566 A1 | 3/1997 |
| JP | 09-103684 A1 | 4/1997 |
| JP | 10-325314 A1 | 12/1998 |
| JP | 2931362 B2 | 8/1999 |
| JP | 2002-273124 A1 | 9/2002 |
| JP | 4136319 B2 | 8/2008 |
| JP | 2010-115896 A1 | 5/2010 |
| JP | 2010-229976 A1 | 10/2010 |

OTHER PUBLICATIONS

International Search Report and Written Opinion (Application No. PCT/JP2013/059145) dated May 14, 2013.

* cited by examiner

HONEYCOMB STRUCTURE

TECHNICAL FIELD

The present invention relates to a honeycomb structure, and more particularly, it relates to a honeycomb structure that is a catalyst carrier, also functions as a heater when a voltage is applied to allow controlling a deviation in a temperature distribution when the voltage is applied, and has an excellent thermal shock resistance.

BACKGROUND ART

Heretofore, a honeycomb structure made of cordierite onto which a catalyst is loaded has been used in treatment of a harmful substance in an exhaust gas discharged from a car engine. Moreover, it is also known that a honeycomb structure formed by a sintered silicon carbide body has been used in purification of the exhaust gas (see, for example, Patent Document 1).

When the exhaust gas is treated with the catalyst loaded onto the honeycomb structure, a temperature of the catalyst needs to be raised to a predetermined temperature. However, the catalyst temperature is low at the start of the engine. This has caused the problem that the exhaust gas is not sufficiently purified.

Accordingly, a method in which a heater made of a metal is disposed on an upstream side of a honeycomb structure onto which a catalyst is loaded to raise a temperature of an exhaust gas has been investigated (for example, see Patent Document 2). Additionally, a method in which the catalyst is loaded on a heater made of a metal for use has been investigated (for example, see Patent Document 3).

CITATION LIST

Patent Documents

Patent Document 1: JP 4136319
Patent Document 2: JP 2931362
Patent Document 3: JP-A-5-144549

SUMMARY OF THE INVENTION

When the above-mentioned heater is mounted on a car and used, a power source for use in an electric system of the car is used in common, and, for example, the power source of a high voltage of 200 V is used. However, in the heater made of a metal, an electric resistance is low. In consequence, when such a high-voltage power source is used, a current excessively flows. As a result, there has been the problem that a power source circuit may be damaged.

In Patent Documents 2 and 3, slits, which are resistance adjusting means, are disposed on the heater. This prevents excessive current flow, aiming excellent heat generation by energization. The slits are formed such that a current does not flow between a pair of electrodes at the shortest distance (linearly).

The present invention has been developed in view of the above-mentioned problems, and an its object is to provide a honeycomb structure that is a catalyst carrier, also functions as a heater when a voltage is applied to allow controlling a deviation in a temperature distribution when the voltage is applied, and has furthermore an excellent thermal shock resistance.

Solution to Problem

To solve the above-mentioned problems, according to the present invention, the following honeycomb structure is provided.

[1] A honeycomb structure includes a porous partition wall, a tubular honeycomb structure body, and a pair of electrode members. The porous partition wall defines and forms a plurality of cells. The plurality of cells extends from one end face to another end face to become through channels of a fluid. The tubular honeycomb structure body includes a circumferential wall positioned at an outermost circumference. The pair of electrode members are arranged at a side surface of the honeycomb structure body. The honeycomb structure body has an electrical resistivity of 1 to 200 Ωcm. The respective pair of electrode members are formed into a band-like shape extending in a direction in which the cells of the honeycomb structure body extend. In a cross section perpendicular to the cell extending direction, one of the electrode members in the pair of electrode members is arranged opposite to another of the electrode members in the pair of electrode members sandwiching a center of the honeycomb structure body. One or more of slits are formed at the honeycomb structure body. The slit is open to a side surface. At least the one slit is formed so as not to intersect with a straight line connecting center portions of the respective pair of electrode members in the cross section perpendicular to the cell extending direction.

[2] The honeycomb structure according to [1] is configured as follows. The honeycomb structure body includes two or more of the slits. 50% or more of slits among the two or more slits are formed so as not to intersect with the straight line connecting the center portions of the respective pair of electrode members in the cross section perpendicular to the cell extending direction.

[3] The honeycomb structure according to [2] is configured as follows. All the slits formed at the honeycomb structure body are formed so as not to intersect with the straight line connecting the center portions of the respective pair of electrode members in the cross section perpendicular to the cell extending direction.

[4] The honeycomb structure according to any one of [1] to [3] is configured as follows. A filler to be filled in at least one of the slits is provided. The filler is to be filled to at least some spaces of the slits.

[5] The honeycomb structure according to [4] is configured as follows. Two or more of the slits are formed at the honeycomb structure body. A filler is filled to a slit 50% or more of the two or more slits.

[6] The honeycomb structure according to [5] is configured as follows. Fillers are filled to all of two or more of the slits formed at the honeycomb structure body.

[7] The honeycomb structure according to any one of [4] to [6] is configured as follows. The filler is filled to all spaces in the slit.

Effect of the Invention

With the honeycomb structure of the present invention, the electrical resistivity of the honeycomb structure body is from 1 to 200 Ωcm. Therefore, even when a current is flown using a high-voltage power source, the current does not excessively flow, such that the honeycomb structure can suitably be used as a heater.

Moreover, according to the honeycomb structure of the present invention, each of the pair of electrode members is formed into the band-like shape extending in the direction in which the cells of the honeycomb structure body extend. Furthermore, with the honeycomb structure of the present invention, in the cross section perpendicular to the cell extending direction, the one electrode member in the pair of electrode members is disposed opposite to the other electrode member in the pair of electrode members sandwiching the center of the honeycomb structure body. Therefore, with the honeycomb structure of the present invention, it is possible to control a deviation of a temperature distribution when the voltage is applied.

Furthermore, according to the honeycomb structure of the present invention, one or more of the slits open to the side surface are formed at the honeycomb structure body. Then, the honeycomb structure of the present invention is formed such that at least the one slit does not intersect with the straight line connecting the center portions of the respective pair of electrode members in the cross section perpendicular to the cell extending direction. Thus, the honeycomb structure of the present invention includes the slit at the honeycomb structure body. This features excellent thermal shock resistance. Further, the honeycomb structure of the present invention is formed such that at least the one slit does not intersect with the straight line connecting the center portions of the respective pair of electrode members in the cross section perpendicular to the cell extending direction. Therefore, this also exhibits excellent mechanical strength of the honeycomb structure.

MODE FOR CARRYING OUT THE INVENTION

Next, a mode for carrying out the present invention will be described in detail with reference to the drawings. It should be understood that the present invention is not limited to the following embodiments and that design change, improvement, or a similar change may be suitably added on the basis of ordinary knowledge of a person skilled in the art without departing from the gist of the present invention.

Figure 1:
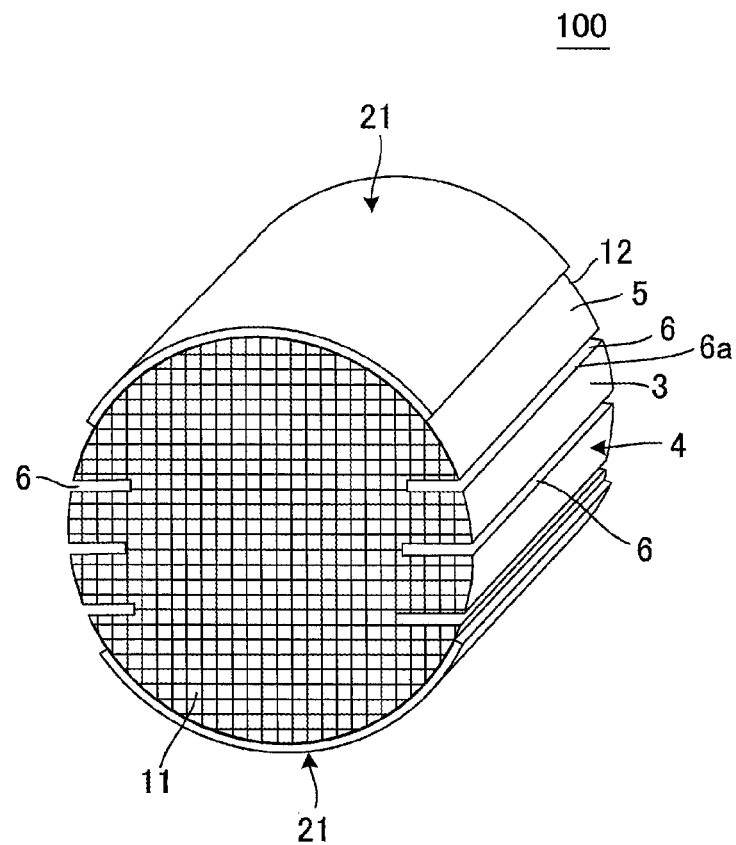
FIG. 1 is a perspective view schematically illustrating a honeycomb structure of an embodiment of the present invention.
Figure 2:
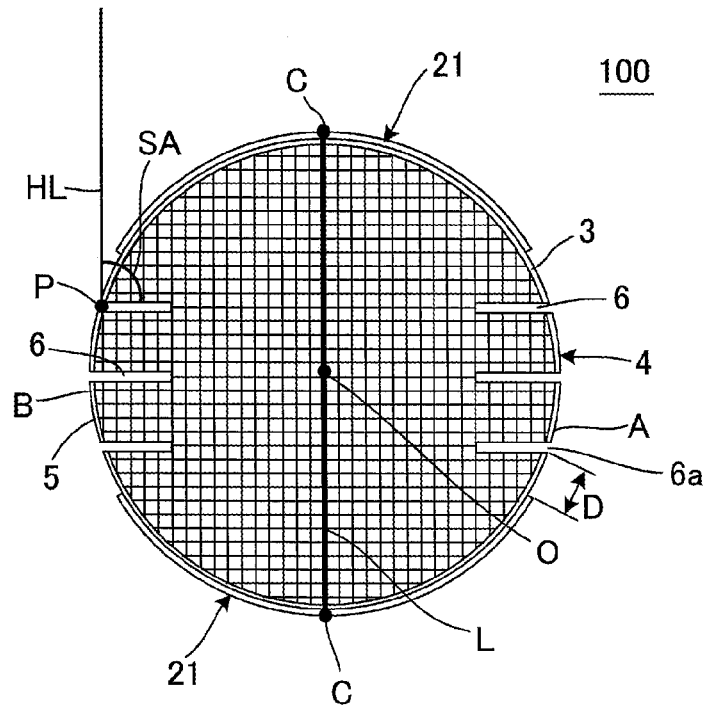
FIG. 2 is a schematic view illustrating a cross section of the honeycomb structure of an embodiment of the present invention perpendicular to a cell extending direction.
Figure 3:
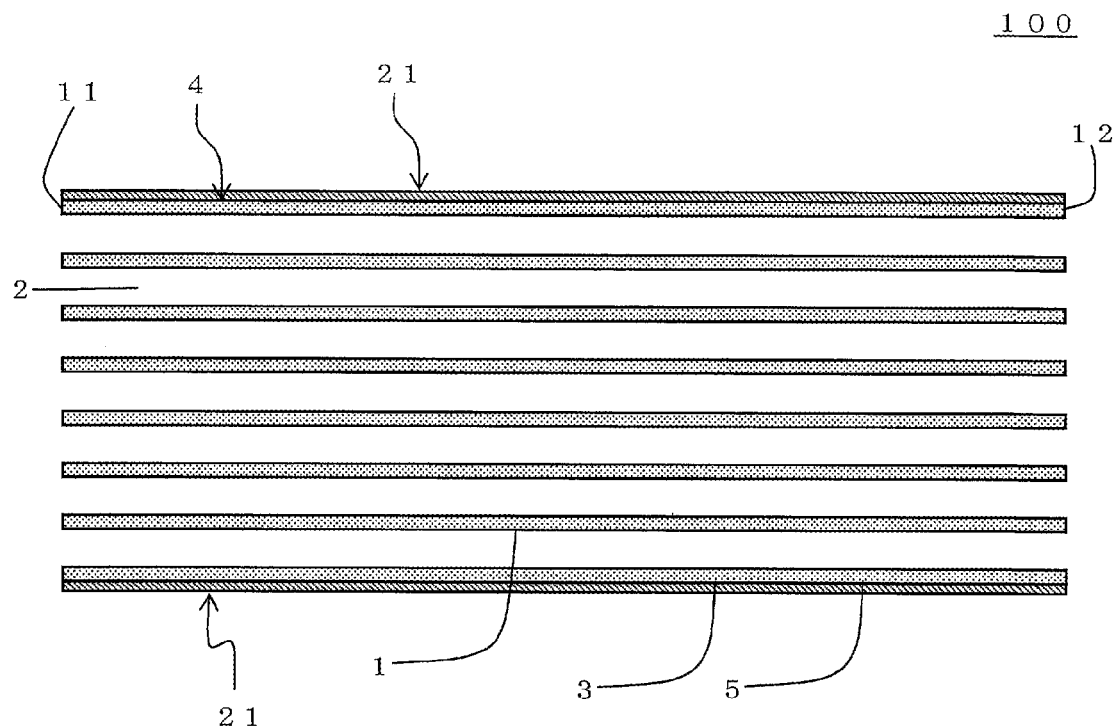
FIG. 3 is a schematic view illustrating the cross section of the honeycomb structure of an embodiment of the present invention parallel to the cell extending direction.

(1) Honeycomb Structure:

A honeycomb structure according to an embodiment of the present invention includes a tubular honeycomb structure body 4 and a pair of electrode members 21 as illustrated in FIG. 1 to FIG. 3. The tubular honeycomb structure body 4 includes porous partition walls 1 which defines and forms a plurality of cells 2 extending from one end face 11 to another end face 12 to become through channels of a fluid and a circumferential wall 3 which positions at an outermost circumference. The pair of electrode members 21 are arranged at a side surface 5 of the honeycomb structure body 4. In a honeycomb structure 100 of the present embodiment, the honeycomb structure body 4 has an electrical resistivity of 1 to 200 Ω/cm. In the honeycomb structure 100 of the present embodiment, each pair of the electrode members 21 and 21 are formed into a band-like shape extending in a direction in which the cells 2 of the honeycomb structure body 4 extend. In the honeycomb structure 100 of the present embodiment, in a cross section perpendicular to the cell 2 extending direction, the one electrode member 21 is disposed opposite to the other electrode member 21 sandwiching a center O of the honeycomb structure body 4. The one electrode member 21 is one of the electrode members 21 in the pair of electrode members 21 and 21 (among the pair of electrode members 21 and 21). The other electrode member 21 is the other electrode member 21 in the pair of electrode members 21 and 21 (among the pair of electrode members 21 and 21). In other words, the one of the electrode members 21 among the pair of electrode members 21 and 21 is the one electrode member 21 while the remaining one electrode member 21 among the pair of electrode members 21 and 21 is the other electrode member 21. Then, the honeycomb structure 100 of the present embodiment includes one or more of the slits 6. The slit 6 opens to the side surface 5 and is disposed at the honeycomb structure body 4. Then, the honeycomb structure 100 of the present embodiment is formed such that at least the one slit 6 does not intersect with "a straight line (a center line) L connecting the center portions C and C of the respective pair of electrode members 21 and 21" in a cross section perpendicular to the cell 2 extending direction. FIG. 1 is a perspective view schematically illustrating a honeycomb structure of an embodiment of the present invention. FIG. 2 is a schematic view illustrating a cross section of the honeycomb structure of an embodiment of the present invention perpendicular to the cell extending direction. FIG. 3 is a schematic view illustrating a cross section of the honeycomb structure of an embodiment of the present invention parallel to a cell extending direction.

The side surface 5 of the honeycomb structure body 4 is a surface of the circumferential wall 3 of the honeycomb structure body 4. "The slit 6 opens to the side surface 5 (of the honeycomb structure body 4)" is a slit opens to the surface of the circumferential wall 3 of the honeycomb structure body 4. "The slit opens to the outer circumference of the honeycomb structure body" means that by providing an open end on the slit forms an open hole at the surface of the circumferential wall. The slit may be open to the end face as well as opening to the side surface.

Thus, in the honeycomb structure 100 of the present embodiment, the electrical resistivity of the honeycomb structure body 4 is from 1 to 200 Ωcm. Therefore, even when a current is flown using a high-voltage power source, the current does not excessively flow, such that the honeycomb structure 100 can suitably be used as a heater. Moreover, in the honeycomb structure 100 of the present embodiment, each of the pair of electrode members 21 and 21 is formed into the band-like shape extending in the direction in which the cells 2 of the honeycomb structure body 4 extend. Furthermore, in the honeycomb structure 100 of the present embodiment, in the cross section perpendicular to the cell 2 extending direction, the one electrode member 21 in the pair of electrode members 21 and 21 is disposed opposite to the other electrode member 21 in the pair of electrode members 21 and 21 sandwiching the center O of the honeycomb structure body 4. Therefore, in the honeycomb structure 100 of the present embodiment, it is possible to control a deviation of a temperature distribution when the voltage is applied. Furthermore, in the honeycomb structure 100 of the present embodiment, one or more of the slits 6 open to the side surface 5 are formed at the honeycomb structure body 4. Then, the honeycomb structure 100 of the present embodiment is formed such that at least the one slit 6 does not intersect with the straight line (the center line) L connecting the center portions C and C of the respective pair of electrode members 21 and 21 in the cross section perpendicular to the cell 2 extending direction. Thus, the honeycomb structure of the present embodiment includes the slit 6 at the honeycomb structure body 4. This allows controlling a deviation in the temperature distribution when a voltage is applied, excellent in thermal shock resistance. Further, the honeycomb structure 100 of the present embodiment is formed such that at least the one slit 6 does not intersect with the straight line connecting the center portions C and C of the respective pair of electrode members 21 and 21 in the cross section perpendicular to the cell 2 extending direction. Therefore, in particular, it is possible to control the deviation of the temperature distribution when a voltage is applied. At least the one slit 6 is formed so as not to intersect with the straight line connecting the center portions C and C of the respective pair of electrode members 21 and 21 in the cross section perpendicular to the cell 2 extending direction, also exhibiting excellent mechanical strength of the honeycomb structure 100.

Figure 4:
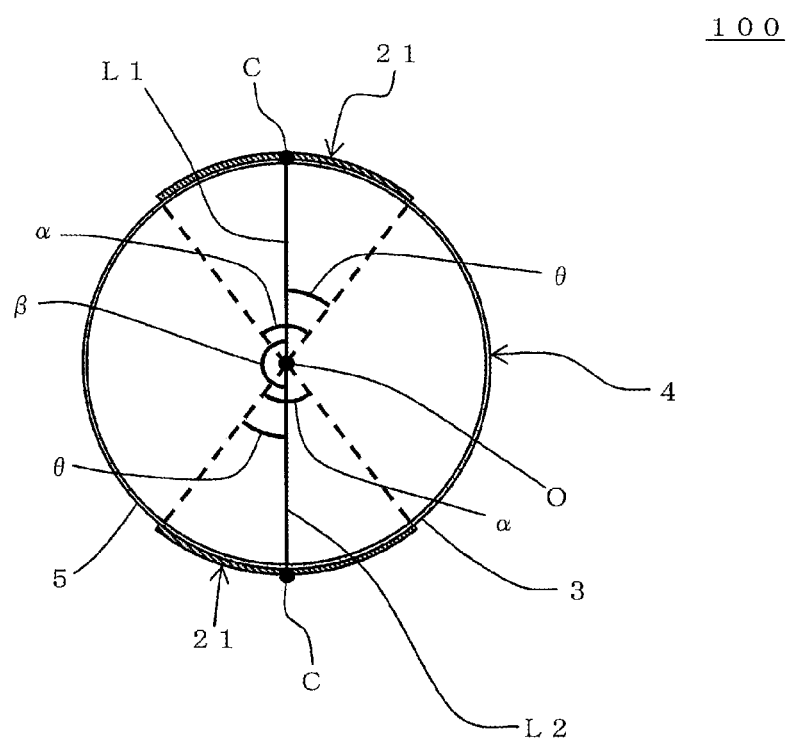
FIG. 4 is a schematic view illustrating the cross section of the honeycomb structure of an embodiment of the present invention perpendicular to the cell extending direction.

Here, the meaning of "in a cross section perpendicular to the cell 2 extending direction, the one electrode member 21 in the pair of electrode members 21 and 21 is disposed opposite to the other electrode member 21 in the pair of electrode members 21 and 21 sandwiching a center O of the honeycomb structure body 4." is as follows. That is, as illustrated in FIG. 4, first, in the cross section perpendicular to the cell 2 extending direction, "a line segment connecting the center portion C (a center point in "the circumferential direction of the honeycomb structure body 4") of the one electrode member 21 and the center O of the honeycomb structure body 4" is referred to as a line segment L1. Then, in the cross section perpendicular to the cell 2 extending direction, "a line segment connecting the center portion C (the center point in "the circumferential direction of the honeycomb structure body 4") of the other electrode member 21 and the center O of the honeycomb structure body 4" is referred to as a line segment L2. Then, the pair of electrode members 21 and 21 are meant to be arranged at the honeycomb structure body 4 with a positional relationship such that an angle β, which is formed by the line segment L1 and the line segment L2 (the angle placing "the center O" as a center), is within a range of 170° to 190°. FIG. 4 is a schematic view illustrating the cross section of the honeycomb structure of an embodiment of the present invention perpendicular to the cell extending direction. FIG. 4 omits illustrations of the partition wall and the slits.

In the cross section perpendicular to the cell 2 extending direction of the honeycomb structure 100 of the present embodiment, the slit 6 formed so as not to intersect with the straight line L connecting the center portions C and C of the respective pair of electrode members 21 and 21 may be referred to as "a non-intersecting slit." In the cross section perpendicular to the cell 2 extending direction of the honeycomb structure 100 of the present embodiment, the slit 6 formed so as to intersect with the straight line L connecting the center portions C and C of the respective pair of electrode members 21 and 21 may be referred to as "an intersecting slit." In the honeycomb structure 100 of the present embodiment, it is preferred that two or more of the slits 6 be formed at the honeycomb structure body 4. Additionally, 50% or more of the slits 6 among the two or more slits 6 are preferred to be the non-intersecting slits. Further preferably, all of the slits 6 formed at the honeycomb structure body 4 are the non-intersecting slits. Since 50% or more of the all slits 6 are the non-intersecting slits, this allows preventing degrade of a mechanical strength of the honeycomb structure 100 (the honeycomb structure 100 of the present embodiment is excellent in the mechanical strength). If the non-intersecting slits are less than 50% of the all slits 6, this means that the intersecting slits are increased, possibly degrading the mechanical strength of the honeycomb structure 100. If the non-intersecting slits are less than 50% of the all slits 6, this means that the intersecting slit are increased. Accordingly, the slits significantly block a flow of the current flowing between the pair of electrode members 21 and 21, inhibiting uniform heat generation and possibly resulting in non-uniform heat generation.

In the honeycomb structure 100 of the present embodiment, it is preferred that a depth of the slit 6 be 1 to 80% of a radius of the honeycomb structure body 4 in "the cross section perpendicular to the cell 2 extending direction" (hereinafter may be referred to as "a radius of the honeycomb structure body"). Further preferably, the depth of the slit 6 be 1 to 60% of the radius of the honeycomb structure body and especially preferable to be 1 to 30%. If the depth of the slit 6 is smaller than 1% of the radius of the honeycomb structure body, this may degrade an effect of improving the thermal shock resistance of the honeycomb structure 100. If the depth of the slit 6 is larger than 80% of the radius of the honeycomb structure body, the slits significantly block the flow of the current flowing between the pair of electrode members 21 and 21, inhibiting uniform heat generation and possibly resulting in non-uniform heat generation. The depth of the slit 6 means a distance from "the open end at the side surface 5" of the slit 6 to the deepest position of the slit 6. In the case where a plurality of slits is formed, the depth of the slit 6 may differ depending on the slits or may be all the same.

In the honeycomb structure 100 of the present embodiment, a width of the slit 6 is preferred to be 0.1 to 5% of a length of the outer circumference of the honeycomb structure body 4 in "the cross section perpendicular to the cell 2 extending direction" (hereinafter may be referred to as "an outer peripheral length of the honeycomb structure body"). The width of the slit 6 is further preferable to be 0.1 to 3% of the outer peripheral length of the honeycomb structure body, and especially preferable to be 0.1 to 1%. If the width of the slit 6 is smaller than 0.1% of the outer peripheral length of the honeycomb structure body, an effect of improving the thermal shock resistance of the honeycomb structure 100 may be degraded. If the width of the slit 6 is larger than the 5% of the outer peripheral length of the honeycomb structure body, the mechanical strength of the honeycomb structure 100 may be degraded. The width of the slit 6 means a length of the slit 6 in "the circumferential direction of the honeycomb structure body 4." "The circumferential direction of the honeycomb structure body 4" means a direction along the outer circumference of the honeycomb structure body 4 in "the cross section perpendicular to the cell 2 extending direction." In the case where a plurality of slits is formed, the width of the slit 6 means the width of one slit. In the case where a plurality of slits is formed, the width of the slit 6 may differ depending on the slits or may be all the same.

In the honeycomb structure 100 of the present embodiment, the length of the slit 6 in "the cell extending direction" is preferred to be the same as the length of the honeycomb structure body in "the cell extending direction." That is, it is preferred that the slit 6 be formed across both end faces of the honeycomb structure body (across the whole length). It is also preferable aspect that the length of the slit 6 in "the cell extending direction" be 5 to 70% of the length of the honeycomb structure body in "the cell extending direction." In terms of the thermal shock resistance, the slit 6 is preferred to be across the whole length. However, partially leaving a part where the slit 6 is not formed is preferred in terms of strength. If the slit 6 does not go across the whole length, one end of the slit be preferred to be positioned at the honeycomb end face. In this case, the slit may be formed only at one end face side of the honeycomb structure body (see FIG. 10), or may be formed at both end face sides of the honeycomb structure body (see FIG. 11). In the case where the slit is formed at both end face sides of the honeycomb structure body, it is preferred that a total length of the slit in "the cell extending direction" be 5 to 70% of the length of the honeycomb structure body in "the cell extending direction." In the case where the slit is formed only at the one end face side of the honeycomb structure body, it is preferred that the end face side at which the slit is formed face the direction to which larger thermal shock is applied for use of the honeycomb structure. In the case where a plurality of slits is formed, the length of the slit 6 may differ depending on the slits or may be all the same.

In the case where a plurality of slits are formed, a slit formation pattern (including the number of slits), the depth of the slit, the width of the slit, and the length of the slit are preferred to be a line symmetry setting the center line L as an axis of symmetry.

In the honeycomb structure 100 of the present embodiment, the number of slits 6 is preferred to be 1 to 20, further preferably, 1 to 15, and especially preferably to be 1 to 10. If the number of slits 6 exceeds 20, the mechanical strength of the honeycomb structure 100 may be degraded. The honeycomb structure 100 illustrated in FIG. 1 includes the six slits 6.

In the honeycomb structure 100 of the present embodiment, the slit 6 is formed across both end faces of the honeycomb structure body 4.

In the honeycomb structure 100 of the present embodiment, the slit 6 "whose open end (the open end of the slit 6) position at the side surface 5 of the honeycomb structure body 4 is the closest to the electrode member 21" is referred to as "a shortest distance slit" 6a. A distance D between the electrode member 21 and "the shortest distance slit" 6a is preferably 0.1 to 30 mm, further preferably, 0.5 to 20 mm, and especially preferably, 1 to 10 mm. If the distance D between the electrode member 21 and "the shortest distance slit" 6a is shorter than 0.1 mm, the flow of the current may be blocked, making uniform heat generation difficult. If the distance D between the electrode member 21 and "the shortest distance slit" 6a exceeds 30 mm, this may degrade an effect of improving the thermal shock resistance of the honeycomb structure 100. The distance D between the electrode member 21 and "the shortest distance slit" 6a is, as illustrated in FIG. 2, a distance measured from an end portion of the electrode member 21 in the circumferential direction of the honeycomb structure 100 to "the shortest distance slit" 6a.

The honeycomb structure 100 of the present embodiment, as illustrated in FIG. 1 and FIG. 2, includes the three slits 6 at respective two regions (a region A and a region B) of the side surface 5 of the honeycomb structure body 4 at which "the electrode members 21 are not formed. The honeycomb structure 100 of the present embodiment has the slits where a distance between the opposed slits is longer than the depth of the slits. The distance between the opposed slits is a distance between the slit 6 formed at the region A and the slit 6 formed at the region B.

The honeycomb structure 100 of the present embodiment has the six slits whose slit angles are all 90°. Here, "the slit angle" is defined as follows. As illustrated in FIG. 2, in the cross section perpendicular to the cell extending direction of the honeycomb structure 100 of the present embodiment, an intersection point between the slit 6 and the outer circumference of the honeycomb structure body 4 is referred to as a point P. The point P is referred to as the end point, and a half line (or a line segment) extending from the point P to the outside of the outer circumference of the honeycomb structure body 4 and parallel to the center line L is referred to as a half line HL. The center line L is, as described above, "a straight line connecting the center portions of the respective pair of electrodes." Then, among angles formed by the slit 6 and the half line HL, an angle that is not larger (an angle of 180° or less) is referred to as "a slit angle SA." Here, "an angle that is not larger" means "the smaller angle, or if the angles are the same, the same angles." The half line means a straight line that has an end at one side and extends to the other endlessly. "The half line HL extends to the outside of the outer circumference of the honeycomb structure body 4" means that the half line HL extends in the direction not passing through the inside of the cross section of the honeycomb structure body 4.

In the honeycomb structure 100 of the present embodiment, a material of the partition walls 1 and the circumferential wall 3 preferably contains a silicon-silicon carbide composite material or a silicon carbide as a main component, and the material is further preferably the silicon-silicon carbide composite material or the silicon carbide. When "the material of the partition walls 1 and the circumferential wall 3 contains silicon carbide particles and the silicon as the main component", this means that the partition walls 1 and the circumferential wall 3 contain 90 mass % or more of the silicon carbide particles and the silicon (the total mass) in the whole material. By the use of such materials, the electrical resistivity of the honeycomb structure body can be from 1 to 200 Ωcm. Here, the silicon-silicon carbide composite material contains silicon carbide particles as aggregates, and silicon as a binding agent to bind the silicon carbide particles. The plurality of silicon carbide particles are preferably bound by silicon so as to form pores among the silicon carbide particles. Moreover, the silicon carbide is obtained by sintering the silicon carbide. The electrical resistivity of the honeycomb structure body is a value at 400° C.

As illustrated in FIG. 1 to FIG. 3, in the honeycomb structure 100 of the present embodiment, the side surface 5 of the honeycomb structure body 4 is provided with the pair of electrode members 21 and 21. In the honeycomb structure 100 of the present embodiment, the voltage is applied between the pair of electrode members 21 and 21, thus generating heat. The voltage to be applied is preferably from 12 to 900 V, and further preferably from 64 to 600 V.

As illustrated in FIG. 1 to FIG. 3, each of the pair of electrode members 21 and 21 is formed into "the band-like shape" extending in the direction in which the cells 2 of the honeycomb structure body 4 extend. Moreover, in the cross section perpendicular to the cell 2 extending direction, the one electrode members 21 in the pair of electrode members 21 and 21 is disposed opposite to the other electrode member 21 in the pair of electrode members 21 and 21 sandwiching the center O of the honeycomb structure body 4. Accordingly, it is possible to control a deviation of the current flowing through the inside of the honeycomb structure body 4 when the voltage is applied between the pair of electrode members 21 and 21. In consequence, a deviation of the heat generation in the honeycomb structure body 4 can be controlled. Further, as illustrated in FIG. 4, in the honeycomb structure 100 of the present embodiment, in the cross section perpendicular to the cell 2 extending direction, it is preferred that 0.5 times of central angles α of the respective electrode members 21 and 21 (angles θ of 0.5 times of the central angles α) be 15 to 65°. This can further efficiently control the deviation of heat generation inside of the honeycomb structure body 4. Thus, the shape of the electrode member 21 "where 0.5 times of the central angle α of the electrode member 21 is 15 to 65° and extends in the cell extending direction" is one aspect of "the band-like." "The central angle α of the electrode member 21", as illustrated in FIG. 4, is an angle formed by two line segments connecting both ends of the electrode members 21 and the center O of the honeycomb structure body 4 in the cross section perpendicular to the cell extending direction. In other words, "the central angle α of the electrode member 21" is an inner angle at the center O part in a shape (a fan shape and the like) formed by "the electrode member 21", "the line segment connecting the one end portion of the electrode member 21 and the center O", and "the line segment connecting the other end portion of the electrode member 21 and the center O" in the perpendicular cross section. Here, "the perpendicular cross section" is "the cross section perpendicular to the cell extending direction of the honeycomb structure".

In the cross section perpendicular to the cell 2 extending direction, it is further preferably that the upper limit value of "the angle θ 0.5 times of the central angle α" of the electrode members 21 and 21 be 60° and especially preferably, 55°. In the cross section perpendicular to the cell 2 extending direction, it is further preferably that the lower limit value of "the angle θ 0.5 times of the central angle α" of the electrode members 21 and 21 be 20° and especially preferably, 30°. Moreover, "the angle θ 0.5 times of the central angle α" of the one electrode member 21 is preferably a size of 0.8 to 1.2 times of "the angle θ 0.5 times of the central angle α" of the other electrode member 21, and is further preferably a size of 1.0 time (the same size). In consequence, it is possible to control the deviation of the current flowing through the inside of the honeycomb structure body 4, when the voltage is applied between the pair of electrode members 21 and 21. As a result, it is possible to control the deviation of the heat generation in the honeycomb structure body 4.

A thickness of the electrode member 21 is preferably from 0.01 to 5 mm, and further preferably from 0.01 to 3 mm. In such a range, the heat can uniformly be generated. If the thickness of the electrode member 21 is thinner than 0.01 mm, the electrical resistance becomes high, failing to uniform heat generation. When the thickness of the electrode member 21 is thicker than 5 mm, the electrode member 21 may be damaged at canning.

The electrode member 21 preferably contains the silicon carbide particles and the silicon as main components, and is further preferably made of the silicon carbide particles and silicon as raw materials, except usually contained impurities. Here, "the silicon carbide particles and silicon as the main components" means that a total mass of the silicon carbide particles and silicon is 90 mass % or more of a mass of the whole electrode member. In consequence, when the electrode member 21 contains the silicon carbide particles and silicon as the main components, the components of the electrode member 21 are the same as or close to the components of the honeycomb structure body 4 (when the material of the honeycomb structure body is silicon carbide). Accordingly, thermal expansion coefficients of the electrode member 21 and the honeycomb structure body 4 become the same value or close values. Moreover, the materials are the same material or close materials, and hence a bonding strength between the electrode member 21 and the honeycomb structure body 4 increases. Therefore, even when a heat stress is applied to the honeycomb structure, peeling of the electrode member 21 from the honeycomb structure body 4 can be prevented, and a bonding portion between the electrode member 21 and the honeycomb structure body 4 can be prevented from being damaged.

As illustrated in FIG. 1 and FIG. 2, in the honeycomb structure 100 of the present embodiment, the respective pair of electrode members 21 and 21 are formed into the band-like shape extending in the cell extending direction of the honeycomb structure body 4 and "across both end portions (between both end faces 11 and 12)." Thus, since the pair of electrode members 21 and 21 are arranged across both end portions of the honeycomb structure body 4, the deviation of the current flowing inside of the honeycomb structure body 4 can be further efficiently controlled when a voltage is applied between the pair of electrode members 21 and 21. This allows further efficiently controlling the deviation of heat generation inside of the honeycomb structure body 4. Here, "the electrode member 21 is formed (arranged) across both end portions of the honeycomb structure body 4" means that the one end portion of the electrode member 21 is in contact with the one end portion (the one end face) of the honeycomb structure body 4 while the other end portion of the electrode member 21 is in contact with the other end portion (the other end face) of the honeycomb structure body 4.

In the honeycomb structure 100 of the present embodiment, it is also a preferable aspect that both end portions of the electrode member 21 in "the cell 2 extending direction of the honeycomb structure body 4" are not in contact with (do not reach) both end portions (both end faces 11 and 12) of the honeycomb structure body 4. It is also a preferable aspect that the one end portion of the electrode member 21 is in contact with (reaches) the one end portion (the one end face 11) of the honeycomb structure body 4 while the other end portion of the electrode member 21 is not in contact with (does not reach) the other end portion (the other end face 12) of the honeycomb structure body 4. Thus, when at least one of the end portions of the electrode member 21 has a structure not in contact with (does not reach) the end portion (the end face) of the honeycomb structure body 4, the thermal shock resistance of the honeycomb structure can be improved. That is, from a perspective of "improving the thermal shock resistance of the honeycomb structure", the respective pair of electrode members 21 and 21 are preferred to have the structure where at least one of the end portions is not in contact with (does not reach) the end portion (the end face) of the honeycomb structure body 4. As described above, to put emphasis on the aspect of "further effectively controlling the deviation of heat generation by further effectively controlling the deviation of a current in the honeycomb structure body 4", the pair of electrode members 21 and 21 are preferred to be formed across both end portions of the honeycomb structure body 4. On the other hand, to put emphasis on the aspect of "improving the thermal shock resistance of the honeycomb structure", it is preferred that at least one of the end portions at the respective pair of electrode members 21 and 21 be not in contact with (do not reach) the end portion (the end face) of the honeycomb structure body 4.

Figure 13:
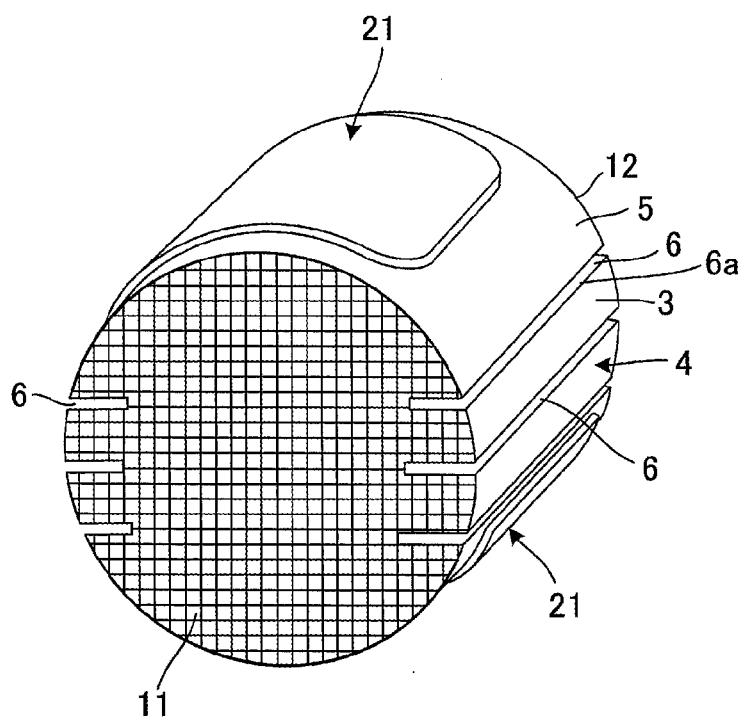
FIG. 13 is a perspective view illustrating the honeycomb structure where both end portions of respective pair of electrode members are not in contact with end portions of a honeycomb structure body.

In the honeycomb structure of the present embodiment, as illustrated in, for example, FIG. 1 to FIG. 3, the electrode member 21 has a shape obtained as if by curving a flat surface-like rectangular member along an outer circumference of a cylindrical shape. Here, the shape at a time when the curved electrode member 21 is deformed into a flat surface-like member that is not curved is referred to as "a planar shape" of the electrode member 21. The above-mentioned "planar shape" of the electrode member 21 illustrated in FIG. 1 to FIG. 3 is a rectangular shape. Moreover, "an outer circumference shape of the electrode member" means "the outer circumference shape in the planar shape of the electrode member". In the honeycomb structure of the present embodiment, as illustrated in FIG. 1 to FIG. 3, the outer circumference shape of the band-like electrode member 21 may also have a rectangular shape. However, the outer circumference shape of the band-like electrode member 21 may also have a rectangular shape whose corner portions are formed into a curved shape. The outer circumference shape of the band-like electrode member 21 may also have a rectangular shape whose corner portions are linearly chamfered. FIG. 13 illustrates an example of a honeycomb structure 190 where both end portions of the respective pair of electrode members 21 and 21 are not in contact with (do not reach) the end portions (the end faces) of the honeycomb structure body 4. In the honeycomb structure 190 illustrated in FIG. 13, the outer circumference shape of the band-like electrode member 21 has a shape of "rectangular with curved corner portions."

An electrical resistivity of the electrode member 21 is preferably from 0.1 to 100 Ωcm, and further preferably from 0.1 to 50 Ωcm. In such a range of the electrical resistivity of the electrode member 21, the pair of electrode members 21 and 21 effectively perform a function of an electrode in a piping line through which high-temperature exhaust gas flows. When the electrical resistivity of the electrode member 21 is smaller than 0.1 Ωcm, a temperature of the honeycomb structure body may easily rise in the vicinities of both ends of the electrode member 21 in the cross section perpendicular to the cell extending direction. When the electrical resistivity of the electrode member 21 is larger than 100 Ωcm, the current does not easily flow, and the electrode member 21 may not easily perform the function of the electrode. The electrical resistivity of the electrode member is a value at 400° C.

A porosity of the electrode member 21 is preferably from 30 to 60%, and further preferably from 30 to 55%. In such a range of the porosity of the electrode member 21, a suitable electrical resistivity can be obtained. When the porosity of the electrode member 21 is smaller than 30%, the electrode member 21 may be deformed at manufacturing. When the porosity of the electrode member 21 is larger than 60%, the electrical resistivity may excessively increase. The porosity is a value measured by a mercury porosimeter.

An average pore diameter of the electrode member 21 is preferably from 5 to 45 μm, and further preferably from 7 to 40 μm. In such a range of the average pore diameter of the electrode member 21, a suitable electrical resistivity can be obtained. When the average pore diameter of the electrode member 21 is smaller than 5 μm, the electrical resistivity may excessively increase. When the average pore diameter of the electrode member 21 is larger than 45 μm, the electrode member 21 has a degraded strength and may be easily damaged. The average pore diameter is a value measured by the mercury porosimeter.

When the main components of the electrode member 21 are the silicon carbide particles and silicon, an average particle diameter of the silicon carbide particles contained in the electrode member 21 is preferably from 10 to 60 μm, and further preferably from 20 to 60 μm. In such a range of the average particle diameter of the silicon carbide particles contained in the electrode member 21, the electrical resistivity of the electrode member 21 can be controlled in a range of 0.1 to 100 Ωcm. When the average pore diameter of the silicon carbide particles contained in the electrode member 21 is smaller than 10 μm, the electrical resistivity of the electrode member 21 may excessively increase. When the average pore diameter of the silicon carbide particles contained in the electrode member 21 is larger than 60 μm, the electrode member 21 has a degraded strength and may be easily damaged. The average particle diameter of the silicon carbide particles contained in the electrode member 21 is a value measured by a laser diffraction method.

A ratio of a mass of silicon contained in the electrode member 21 is preferably from 20 to 40 mass %, and further preferably from 25 to 35 mass % with respect to "a total of respective masses of the silicon carbide particles and silicon" contained in the electrode member 21. In such a range of a ratio of the mass of silicon with respect to the total of respective masses of the silicon carbide particles and silicon contained in the electrode member 21, the electrical resistivity of the electrode member 21 can be set in a range of 0.1 to 100 Ωcm. When the ratio of the mass of silicon with respect to the total of respective masses of the silicon carbide particles and silicon contained in the electrode member 21 is smaller than 20 mass %, the electrical resistivity may excessively increase. On the other hand, when the ratio is larger than 40 mass %, the electrode member may be easily deformed at the manufacturing.

In the honeycomb structure 100 of the present embodiment, a partition wall thickness is preferably from 50 to 200 μm, and further preferably from 70 to 130 μm. In such a range of the partition walls thickness, a pressure loss at flowing of the exhaust gas can be prevented from being excessively increased even in a case where the honeycomb structure 100 is used as the catalyst carrier to load the catalyst. When the partition walls thickness is thinner than 50 μm, the strength of the honeycomb structure may degrade. When the partition walls thickness is thicker than 200 μm, the pressure loss at the flowing of the exhaust gas may increase in the case where the honeycomb structure 100 is used as the catalyst carrier to load the catalyst.

In the honeycomb structure 100 of the present embodiment, a cell density is preferably from 40 to 150 cells/cm$^2$, and further preferably from 70 to 100 cells/cm$^2$. In such a range of the cell density, purification performance of the catalyst can be enhanced in a state where the pressure loss at the flowing of the exhaust gas is decreased. When the cell density is smaller than 40 cells/cm$^2$, a catalyst loading area may decrease. When the cell density is larger than 150 cells/cm$^2$, the pressure loss may increase in the case where the honeycomb structure 100 is employed as the catalyst carrier to load the catalyst and the exhaust gas is flown.

In the honeycomb structure 100 of the present embodiment, an average particle diameter of silicon carbide particles (aggregates) constituting the honeycomb structure body 4 is preferably from 3 to 50 μm, and further preferably from 3 to 40 μm. In such a range of the average particle diameter of the silicon carbide particles constituting the honeycomb structure body 4, the electrical resistivity of the honeycomb structure body 4 at 400° C. can be from 1 to 200 Ωcm. When the average particle diameter of the silicon carbide particles is smaller than 3 μm, the electrical resistivity of the honeycomb structure body 4 may increase. When the average particle diameter of the silicon carbide particles is larger than 50 μm, the electrical resistivity of the honeycomb structure body 4 may decrease. Furthermore, when the average particle diameter of the silicon carbide particles is larger than 50 μm, an extrusion forming die may be clogged with a forming raw material at the extrusion of a honeycomb formed structure. The average particle diameter of the silicon carbide particles is a value measured by the laser diffraction method.

In the honeycomb structure 100 of the present embodiment, the electrical resistivity of the honeycomb structure body 4 is from 1 to 200 Ωcm, and preferably from 10 to 100 Ωcm. When the electrical resistivity is smaller than 1 Ωcm, the current may excessively flow, for example, in a case where the honeycomb structure 100 is energized by a power source of a high voltage of 200 V or more (the voltage is not limited to 200 V). When the electrical resistivity is larger than 200 Ωcm, the current does not easily flow and the heat may be not sufficiently generated, for example, in the case where the honeycomb structure 100 is energized by the power source of the high voltage of 200 V or more (the voltage is not limited to 200 V). The electrical resistivity of the honeycomb structure body is a value measured by a four-terminal method.

In the honeycomb structure 100 of the present embodiment, the electrical resistivity of the electrode member 21 is preferably lower than the electrical resistivity of the honeycomb structure body 4. Further, the electrical resistivity of the electrode member 21 is further preferably 20% or less, and especially preferably from 1 to 10% of the electrical resistivity of the honeycomb structure body 4. When the electrical resistivity of the electrode member 21 is 20% or less of the electrical resistivity of the honeycomb structure body 4, the electrode member 21 further effectively functions as the electrode.

In the honeycomb structure 100 of the present embodiment, in the case where the material of the honeycomb structure body 4 is the silicon-silicon carbide composite material, a ratio of "the mass of silicon as the binding agent" contained in the honeycomb structure body 4 with respect to the sum of "the mass of the silicon carbide particles as the aggregates" contained in the honeycomb structure body 4 and "the mass of silicon as the binding agent" contained in the honeycomb structure body 4 is preferably from 10 to 40 mass %, and further preferably from 15 to 35 mass %. If the ratio is lower than 10 mass %, the strength of the honeycomb structure may be degraded. If the ratio is higher than 40 mass %, the shape cannot possibly be held at firing.

A porosity of the partition walls 1 of the honeycomb structure body 4 is preferably from 35 to 60%, and further preferably from 35 to 45%. When the porosity is less than 35%, the deformation at the firing may be increased. When the porosity is in excess of 60%, the strength of the honeycomb structure may degrade. The porosity is a value measured by the mercury porosimeter.

An average pore diameter of the partition walls 1 of the honeycomb structure body 4 is preferably from 2 to 15 μm and further preferably from 4 to 8 μm. When the average pore diameter is smaller than 2 the electrical resistivity may excessively increase. When the average pore diameter is larger than 15 μm, the electrical resistivity may excessively decrease. The average pore diameter is a value measured by the mercury porosimeter.

A thickness of the circumferential wall 3 constituting the outermost circumference of the honeycomb structure 100 of the present embodiment is preferably from 0.1 to 2 mm. When the thickness is thinner than 0.1 mm, a strength of the honeycomb structure 100 may degrade. When the thickness is thicker than 2 mm, an area of the partition wall onto which a catalyst is loaded may decrease.

In the honeycomb structure 100 of the present embodiment, a shape of the cells 2 in the cross section perpendicular to the cell 2 extending direction is preferably a quadrangular shape, a hexagonal shape, an octagonal shape, or a combination of these shapes. Among them and the like, a square shape and the hexagonal shape are preferred. With such a cell shape, the pressure loss at the flowing of the exhaust gas through the honeycomb structure 100 decreases, achieving excellent purification performance of the catalyst.

There is not any special restriction on a shape of the honeycomb structure (the shape of honeycomb structure body) of the present embodiment. Examples of the shape can include a tubular shape with a round bottom surface (a cylindrical shape), a tubular shape with an oval bottom surface, a tubular shape with a polygonal bottom surface (a quadrangular shape, a pentangular shape, a hexagonal shape, a heptagonal shape, an octagonal shape, and the like), or a similar shape. Moreover, as to a size of the honeycomb structure, an area of the bottom surface is preferably from 2000 to 20000 mm$^2$, and further preferably from 4000 to 10000 mm$^2$. Furthermore, a length of the honeycomb structure in a central axis direction is preferably from 50 to 200 mm, and further preferably from 75 to 150 mm.

An isostatic strength of the honeycomb structure 100 of the present embodiment is preferably 1 MPa or more, and further preferably 3 MPa or more. The isostatic strength preferably has a larger value. However, when a material, a constitution, and the like of the honeycomb structure 100 are taken into consideration, an upper limit is about 6 MPa. When the isostatic strength is less than 1 MPa, the honeycomb structure may be easily damaged during use of the honeycomb structure as the catalyst carrier and the like. The isostatic strength is a value measured under a hydrostatic pressure in water.

The honeycomb structure 100 of the present embodiment is preferably used as a catalyst carrier, in which the catalyst be loaded.

The following describes the honeycomb structure of another embodiment of the present invention.

Figure 5:
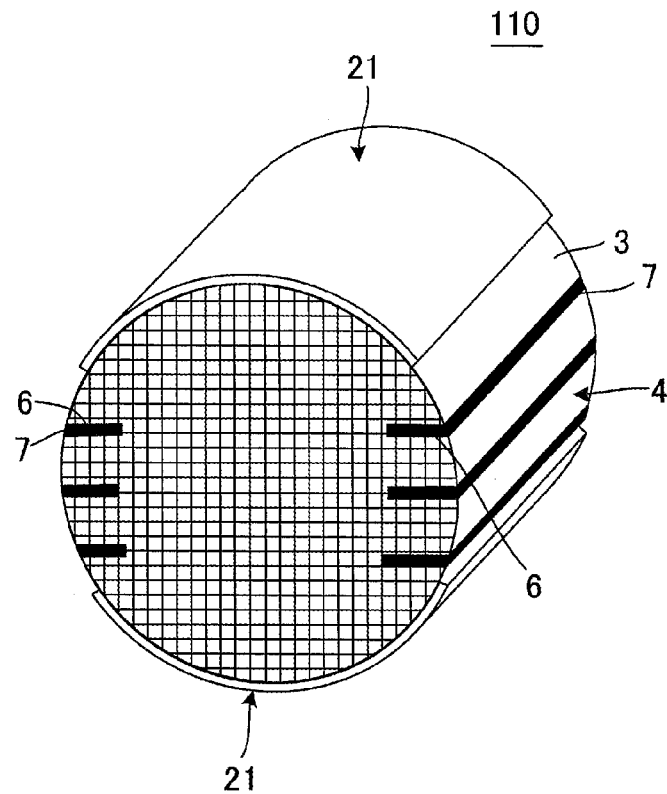
FIG. 5 is a perspective view schematically illustrating the honeycomb structure of another embodiment of the present invention.

As illustrated in FIG. 5, a honeycomb structure 110 of the present embodiment is provided with a filler 7 to be filled in at least one of the slits 6 and the filler 7 fills at least some space in the slit 6. It is preferred that two or more of the slits 6 be formed at the honeycomb structure body 4 and 50% or more of the slits among the two or more of slits 6 be filled with the filler. Further, it is preferred that all of "the two or more slits 6" formed at the honeycomb structure body 4 be filled with the filler. The filler 7 is preferred to fill the all "spaces of the slits 6." In the honeycomb structure 110 illustrated in FIG. 5, the six slits 6 are formed. In all the respective slits 6 the entire space of the slits 6 are filled with the filler 7. Thus, filling the slits 6 with the filler allows enhancing the isostatic strength of the honeycomb structure. FIG. 5 is a perspective view schematically illustrating the honeycomb structure of another embodiment of the present invention. "Fills at least some" may be "some" in the depth direction of the slit, may be "some" in a longitudinal direction of the slit, or may be a combination of these directions.

When the main component of the honeycomb structure body is silicon carbide or a silicon-silicon carbide composite material, the filler 7 preferably contains 50 mass % or more of the silicon carbide. This allows setting the thermal expansion coefficient of the filler 7 to a value close to the thermal expansion coefficient of the honeycomb structure body, allowing improving the thermal shock resistance of the honeycomb structure. Other components contained in the filler 7 can be binder, surfactant, pore former, water, and the like. The filler 7 may also contain 50 mass % or more of silica, alumina, and the like. In this case, other components contained in the filler 7 can be surfactant, organic binder, foamed resin, water, and the like.

In the honeycomb structure 110 of the present embodiment, a Young's modulus of the filler 7 is preferably from 0.001 to 20 GPa, further preferably from 0.005 to 15 GPa, and especially preferably from 0.01 to 10 GPa. If the Young's modulus is lower than 0.001 GPa, the mechanical strength of the honeycomb structure 110 may be degraded. If the Young's modulus is higher than 20 GPa, the thermal shock resistance of the honeycomb structure 110 may be degraded.

In the honeycomb structure 110 of the present embodiment, a porosity of the filler 7 is preferably from 40 to 80%, further preferably from 43 to 70%, and especially preferably from 45 to 65%. If the porosity is lower than 40%, the mechanical strength of the honeycomb structure 110 may be degraded. If the porosity is higher than 80%, the thermal shock resistance of the honeycomb structure 110 may be degraded.

In the honeycomb structure 110 of the present embodiment, the electrical resistivity of the filler 7 is preferably from 100 to 100000% of the electrical resistivity of the honeycomb structure body 4, further preferably from 200 to 100000%, and especially preferably from 300 to 100000%. If the electrical resistivity of the filler 7 is lower than 100%, a current is likely to flow through the filler 7; therefore, it may be difficult to uniformly flow the current through the honeycomb structure body. Too excessive electrical resistivity of the filler 7 does not especially yield a problem. The filler 7 may be an insulator. Actually, the upper limit of the electrical resistivity of the filler 7 is around 100000% of the electrical resistivity of the honeycomb structure body 4. A plurality of kinds of fillers may be employed together as the filler 7. For example, different kinds of fillers can be employed for one slit depending on its site or can be employed depending on slits in the case where a plurality of slits is formed.

The following describes the honeycomb structure of a yet another embodiment of the present invention.

Figure 6:
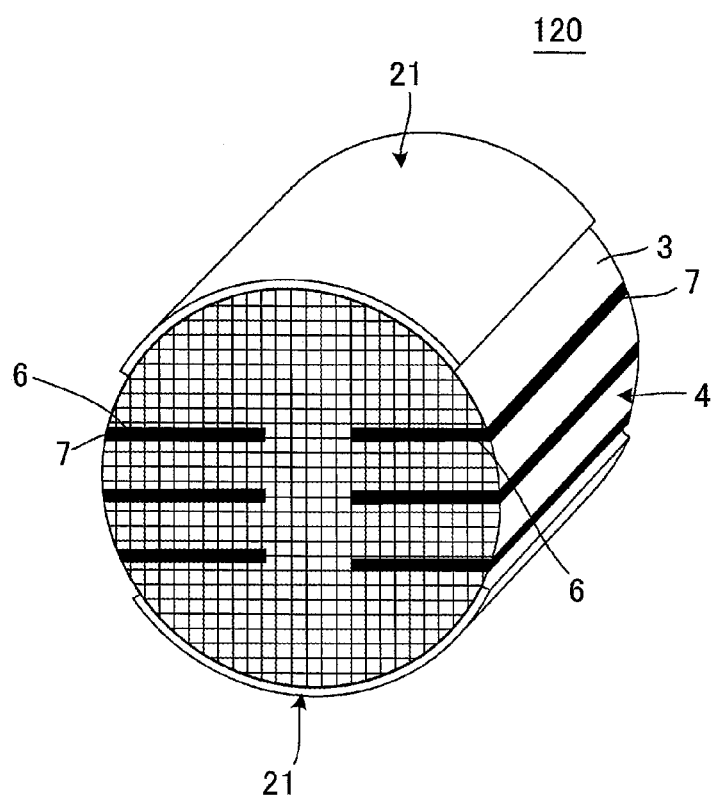
FIG. 6 is a perspective view schematically illustrating the honeycomb structure of a yet another embodiment of the present invention.

As illustrated in FIG. 6, a honeycomb structure 120 of the present embodiment has a distance between the opposed slits being shorter than the depth of the slit 6 in the honeycomb structure of another embodiment of the present invention. A deeper depth of the slit 6 improves the thermal shock resistance. However, since the current is less likely to flow, this makes uniform heat generation difficult. Accordingly, it is preferred that the depth of the slit be appropriately determined considering these balances. In the honeycomb structure 120 of the present embodiment, the fillers 7 are filled to the slits 6; however, the fillers 7 may not fill the slits 6. FIG. 6 is a perspective view schematically illustrating the honeycomb structure of a yet another embodiment of the present invention.

Figure 7:
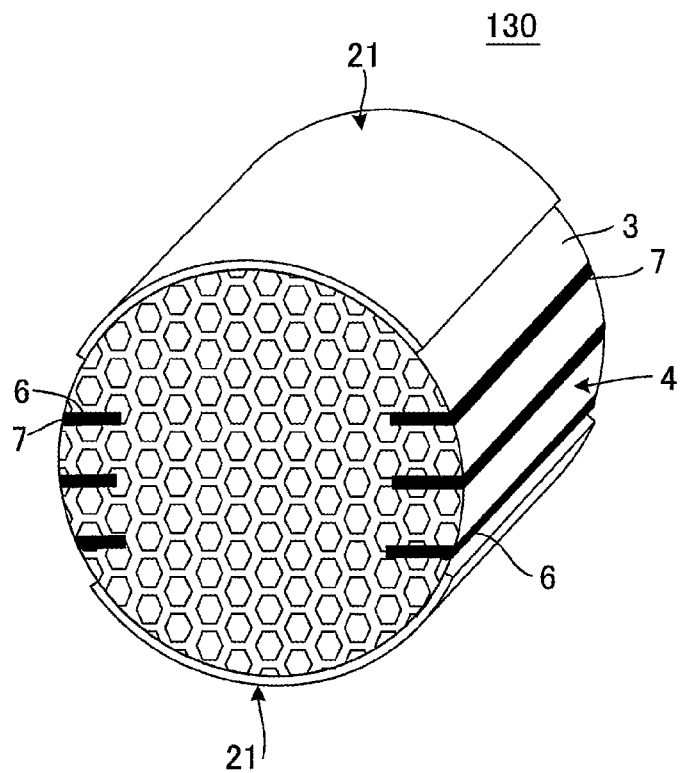
FIG. 7 is a perspective view schematically illustrating the honeycomb structure of a yet another embodiment of the present invention.

The following describes the honeycomb structure of a yet another embodiment of the present invention. As illustrated in FIG. 7, a honeycomb structure 130 of the present embodiment has the cell having a hexagonal shape in the cross section perpendicular to the cell extending direction in the honeycomb structure of another embodiment of the present invention (the honeycomb structure 110 (FIG. 5)). "The shape of the cell" in the cross section perpendicular to the cell extending direction may be simply hereinafter referred to as "the cell shape." The cell with the hexagonal shape is advantageous in that stress from the outer circumference is dispersed. In the honeycomb structure 130 of the present embodiment, the fillers 7 are filled to the slits 6; however, the fillers 7 may not fill the slits 6. FIG. 7 is a perspective view schematically illustrating the honeycomb structure of a yet another embodiment of the present invention.

Figure 8:
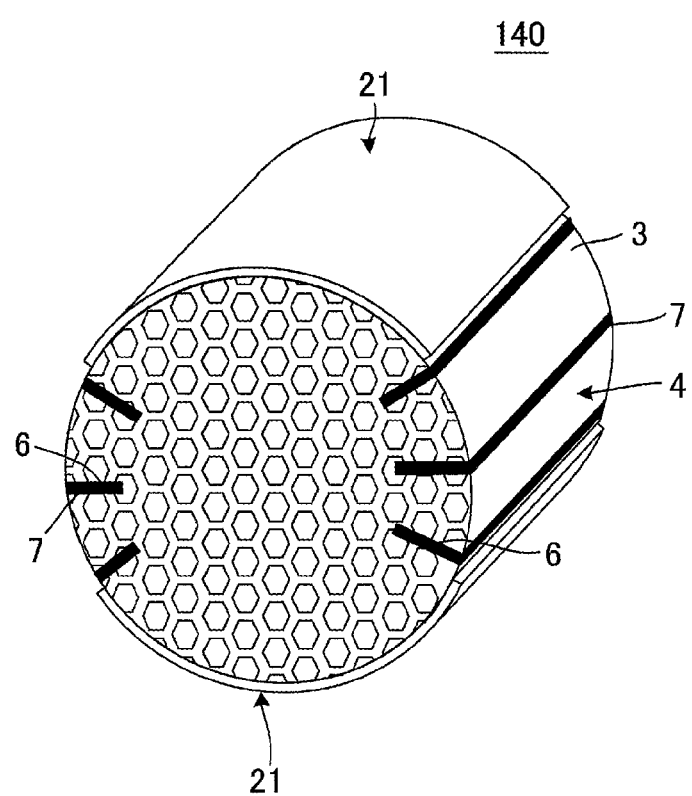
FIG. 8 is a perspective view schematically illustrating the honeycomb structure of a yet another embodiment of the present invention.

The following describes the honeycomb structure of a yet another embodiment of the present invention. As illustrated in FIG. 8, a honeycomb structure 140 of the present embodiment has a slit angle being changed in the honeycomb structure of a yet another embodiment of the present invention (the honeycomb structure 130 (FIG. 7)). In the honeycomb structure 140 of the present embodiment, the fillers 7 are filled to the slits 6; however, the fillers 7 may not fill the slits 6. FIG. 8 is a perspective view schematically illustrating the honeycomb structure of a yet another embodiment of the present invention.

Figure 9:
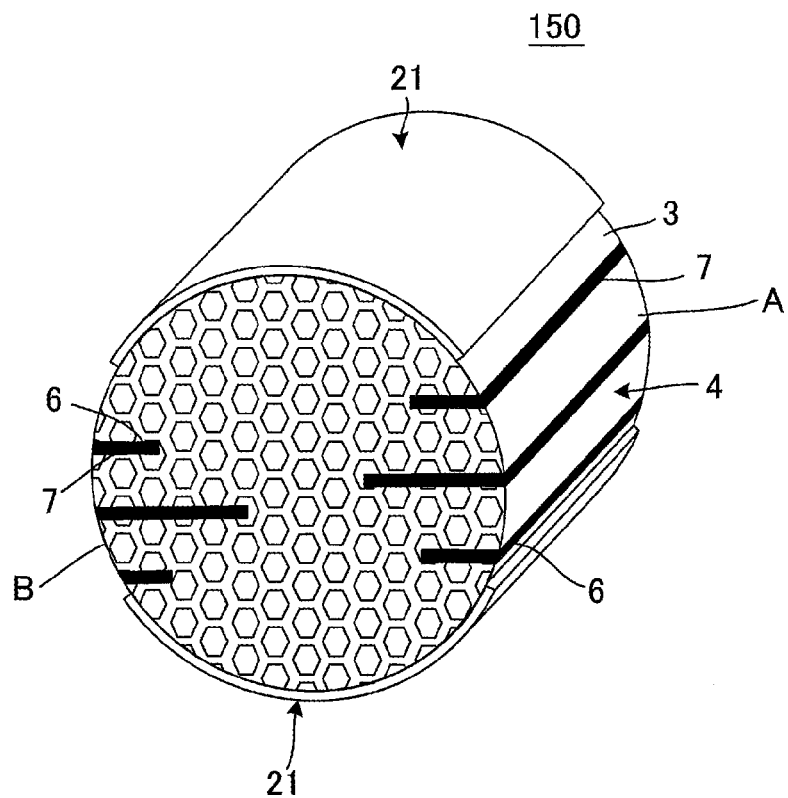
FIG. 9 is a perspective view schematically illustrating the honeycomb structure of a yet another embodiment of the present invention.

The following describes the honeycomb structure of a yet another embodiment of the present invention. As illustrated in FIG. 9, a honeycomb structure 150 of the present embodiment has depths of some slits being deepen in the honeycomb structure of a yet another embodiment of the present invention (the honeycomb structure 130 (FIG. 7)). Specifically, in the honeycomb structure 150 of the present embodiment, the depths of the slits located at the center among the three slits formed at the respective region A and region B are deeper. In the honeycomb structure 150 of the present embodiment, the fillers 7 are filled to the slits 6; however, the fillers 7 may not fill the slits 6. FIG. 9 is a perspective view schematically illustrating the honeycomb structure of a yet another embodiment of the present invention.

Figure 10:
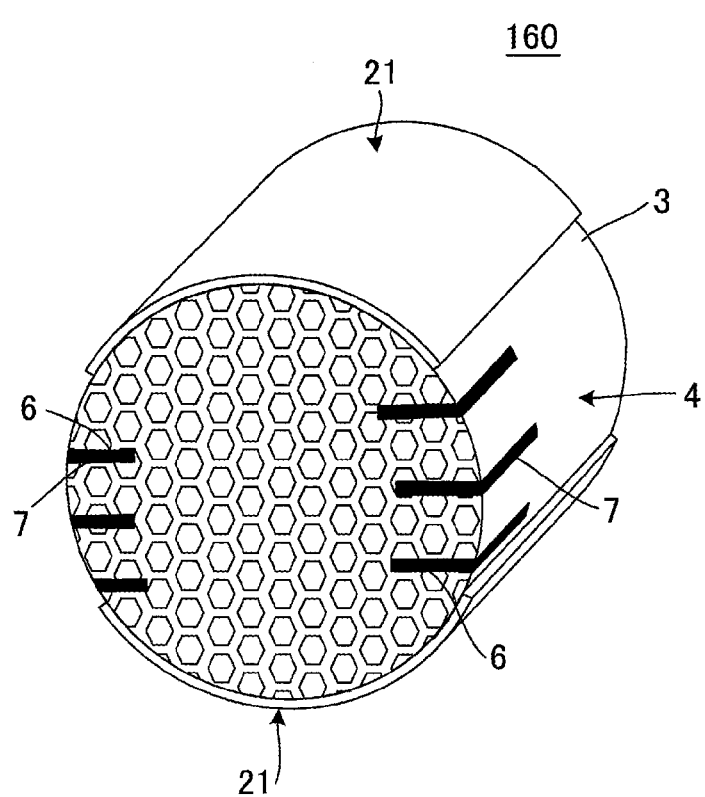
FIG. 10 is a perspective view schematically illustrating the honeycomb structure of a yet another embodiment of the present invention.

The following describes the honeycomb structure of a yet another embodiment of the present invention. As illustrated in FIG. 10, a honeycomb structure 160 of the present embodiment has the lengths of the slits 6 in "the cell 2 extending direction" become shorter in the honeycomb structure of a yet another embodiment of the present invention (the honeycomb structure 130 (FIG. 7)). Specifically, in the honeycomb structure 160 of the present embodiment, the slit 6 is open to the side surface 5 and the one end face of the honeycomb structure body 4 while not opening to the other end face. In other words, the slit 6 has a structure where the slit 6 is formed only at the one end portion of the honeycomb structure body 4. The length of the slit 6 in "the cell 2 extending direction" is shorter than the length of the honeycomb structure body 4 in "the cell 2 extending direction." In the honeycomb structure 160 of the present embodiment, the fillers 7 are filled to the slits 6; however, the fillers 7 may not fill the slits 6. FIG. 10 is a perspective view schematically illustrating the honeycomb structure of a yet another embodiment of the present invention.

Figure 11:
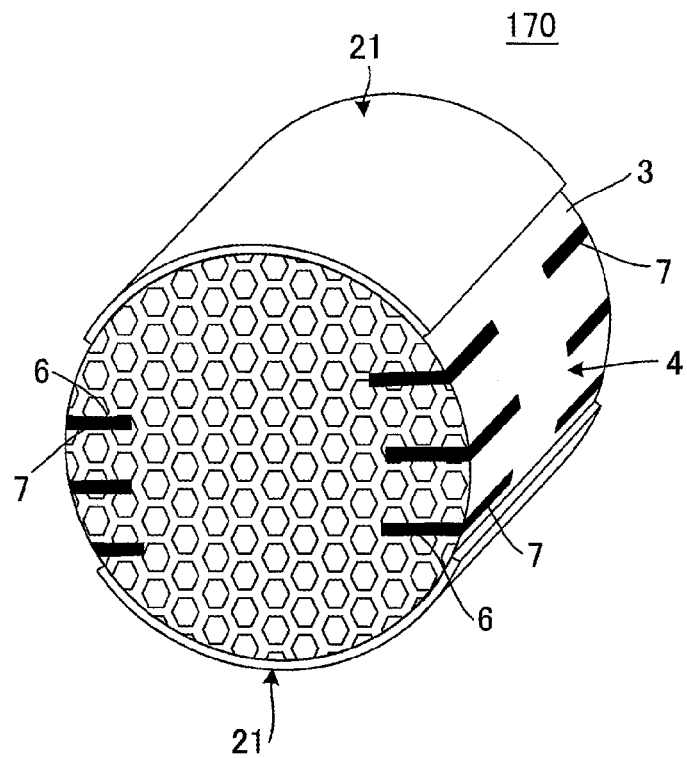
FIG. 11 is a perspective view schematically illustrating the honeycomb structure of a yet another embodiment of the present invention.

The following describes the honeycomb structure of a yet another embodiment of the present invention. As illustrated in FIG. 11, a honeycomb structure 170 of the present embodiment has the slits 6 whose lengths are short in "the cell 2 extending direction" being formed at both end portions of the honeycomb structure body in the honeycomb structure of a yet another embodiment of the present invention (the honeycomb structure 160 (FIG. 10)). In the honeycomb structure 170 of the present embodiment, the fillers 7 are filled to the slits 6; however, the fillers 7 may not fill the slits 6. FIG. 11 is a perspective view schematically illustrating the honeycomb structure of a yet another embodiment of the present invention.

Figure 12:
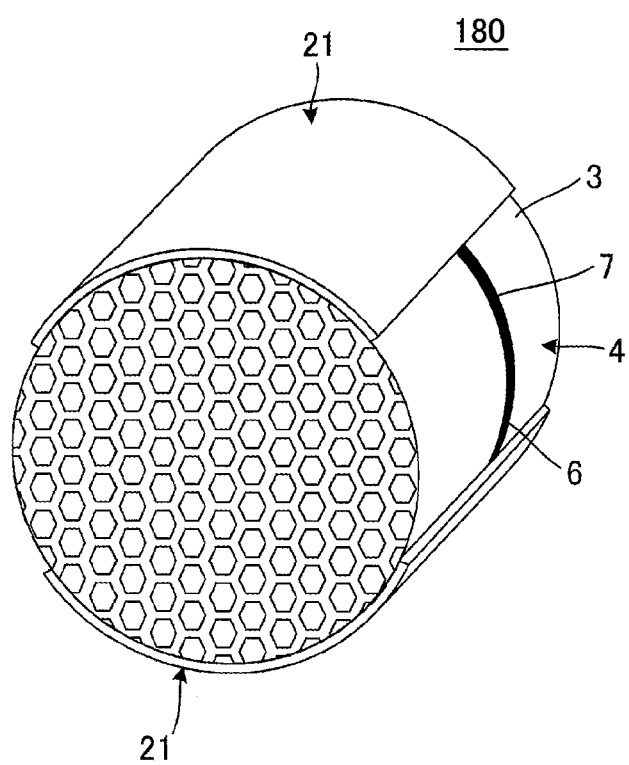
FIG. 12 is a perspective view schematically illustrating the honeycomb structure of a yet another embodiment of the present invention.

The following describes the honeycomb structure of a yet another embodiment of the present invention. As illustrated in FIG. 12, a honeycomb structure 180 of the present embodiment has the six slits extending in "the cell extending direction" not being formed but one slit parallel to the end face of the honeycomb structure body 4 being formed in the honeycomb structure 130 illustrated in FIG. 7, the six slits extending in "the cell extending direction" are not formed but one slit parallel to the end face of the honeycomb structure body 4 is formed. In the honeycomb structure 180 of the present embodiment, the slit 6 is open to the side surface of the honeycomb structure body 4 while not opening to the end face of the honeycomb structure body 4 and being formed parallel to the end face of the honeycomb structure body 4. In the honeycomb structure 180 of the present embodiment, the filler 7 is filled to the slit 6; however, the filler 7 may not fill the slit 6. FIG. 12 is a perspective view schematically illustrating the honeycomb structure of a yet another embodiment of the present invention.

Figure 14:
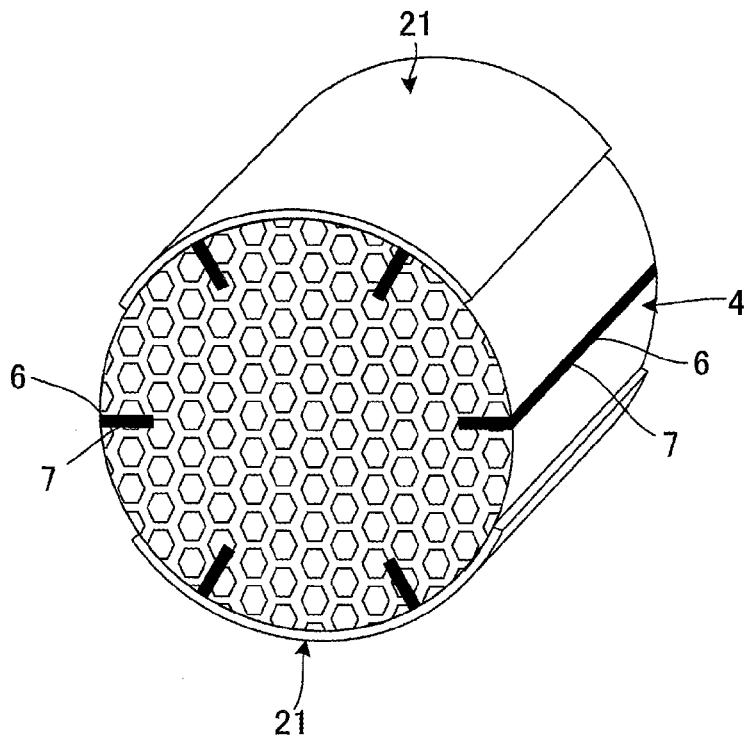
FIG. 14 is a perspective view schematically illustrating the honeycomb structure of a yet another embodiment of the present invention.

The following describes the honeycomb structure of a yet another embodiment of the present invention. As illustrated in FIG. 14, a honeycomb structure 200 of the present embodiment has four slits close to the electrode members 21 among the six slits extending in "the cell extending direction" being formed at positions covered with the electrode members 21 in the honeycomb structure 140 illustrated in FIG. 8. In the honeycomb structure 200 of the present embodiment, the fillers 7 are filled to the slits 6; however, the fillers 7 may not fill the slits 6. FIG. 14 is a perspective view schematically illustrating the honeycomb structure of a yet another embodiment of the present invention.

Figure 16:
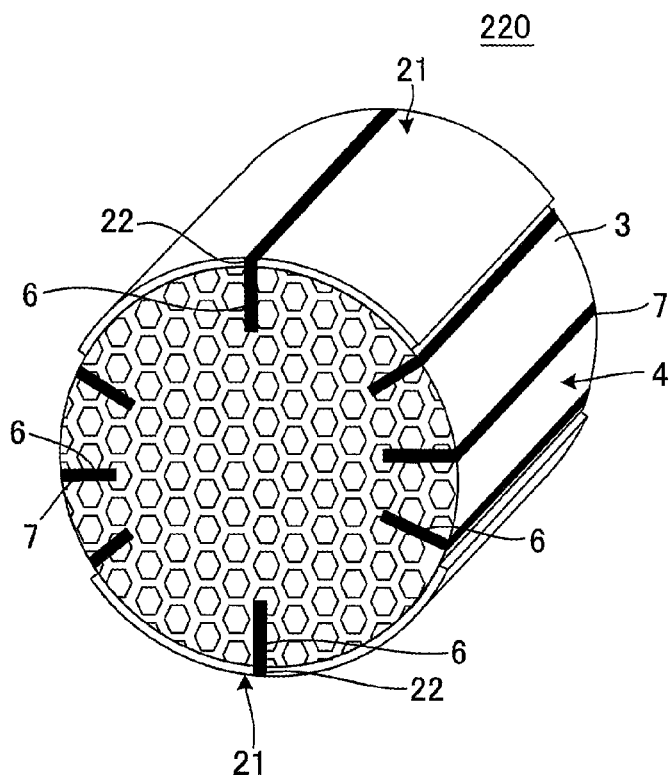
FIG. 16 is a perspective view schematically illustrating the honeycomb structure of a yet another embodiment of the present invention.

The following describes the honeycomb structure of a yet another embodiment of the present invention. As illustrated in FIG. 16, a honeycomb structure 220 of the present embodiment has slits 22 being formed at the electrode members 21 in the honeycomb structure 140 illustrated in FIG. 8. This honeycomb structure 220 further includes two slits at the honeycomb structure body 4, which are formed so as to communicate with the slits 22 formed at the electrode members 21, in addition to the six slits extending in "the cell extending direction" of the honeycomb structure 140 illustrated in FIG. 8. Thus, the slits are formed at the electrode members 21 of high rigidity in addition to the honeycomb structure body 4, thus allowing further improving the thermal shock resistance. The slits formed at the honeycomb structure body 4 so as to communicate with the slits 22 formed at the electrode members 21 are formed so as to overlap with a straight line (a center line) connecting the center portions of the respective pair of electrode members 21 and 21 in the cross section perpendicular to the cell extending direction. The honeycomb structure of the present invention, like the honeycomb structure 220 of the present embodiment, may include a slit so as to overlap the straight line (the center line). The slit not intersecting with the straight line (the center line) but formed so as to overlap improves the thermal shock resistance of the honeycomb structure 220 without significantly blocking the flow of the current flowing between the pair of electrode members 21 and 21. In the honeycomb structure 220 of the present embodiment, among the slits formed at the honeycomb structure body 4, all slits other than the slits formed so as to communicate with the slits 22, which is formed at the electrode members 21, are formed so as not to intersect with the straight line (the center line). However, in the honeycomb structure of the present invention, in the case where two or more slits are formed at the honeycomb structure body 4, some slits may be formed so as to intersect with the straight line (the center line). In the honeycomb structure 220 of the present embodiment, the fillers 7 are filled to the slits 6 and the slits 22; however, the fillers 7 may not fill the slits 6 and/or the slits 22. FIG. 16 is a perspective view schematically illustrating the honeycomb structure of a yet another embodiment of the present invention.

Figure 17:
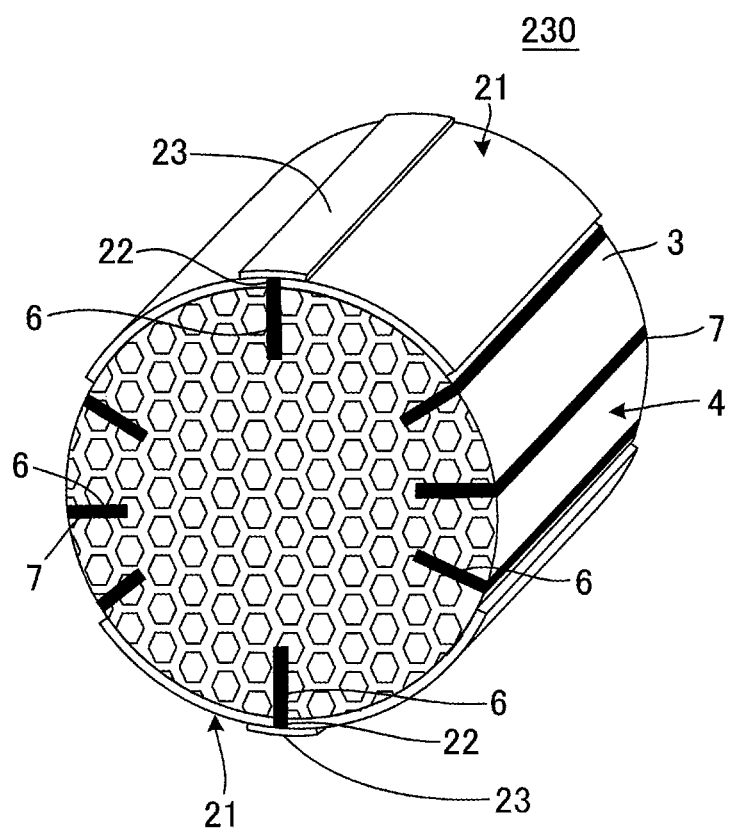
FIG. 17 is a perspective view schematically illustrating the honeycomb structure of a yet another embodiment of the present invention.

The following describes the honeycomb structure of a yet another embodiment of the present invention. As illustrated in FIG. 17, a honeycomb structure 230 of the present embodiment has a terminal 23 for coupling between sites being disposed, to conduct between sites of the electrode member 21, which is divided into the two sites by formation of the slit 22, in the honeycomb structure 220 illustrated in FIG. 16, to conduct between sites of the electrode member 21, which is divided into the two sites by formation of the slit 22, a terminal 23 for coupling between the sites is disposed. That is, the terminal 23 is arranged between the sites of the electrode member 21, which is divided into the two sites by formation of the slit 22. The material of the terminal 23 is preferably the same as the material of the electrode member 21. In the honeycomb structure 230 of the present embodiment, the fillers 7 are filled to the slits 6 and the slits 22; however, the fillers 7 may not fill the slits 6 and/or the slits 22. FIG. 17 is a perspective view schematically illustrating the honeycomb structure of a yet another embodiment of the present invention.

(2) Method for Manufacturing Honeycomb Structure:

The following describes an embodiment of a method for manufacturing the honeycomb structure of the present invention. The method for manufacturing the honeycomb structure of the present embodiment is a method for manufacturing the honeycomb structure whose slits are not filled with fillers.

First, a honeycomb formed structure is prepared by the following method. Metal silicon powder (metal silicon), a binder, a surfactant, a pore former, water, and the like are added to silicon carbide powder (silicon carbide), to prepare a forming raw material. A mass of metal silicon to a total of a mass of the silicon carbide powder and the mass of metal silicon is preferably from 10 to 40 mass %. An average particle diameter of silicon carbide particles in the silicon carbide powder is preferably from 3 to 50 µm, and further preferably from 3 to 40 µm. An average particle diameter of metal silicon (metal silicon powder) is preferably from 2 to 35 µm. The average particle diameters of the silicon carbide particles and metal silicon (metal silicon particles) are values measured by the laser diffraction method. The silicon carbide particles are fine particles of silicon carbide constituting the silicon carbide powder. The metal silicon particles are fine particles of metal silicon constituting the metal silicon powder. It is to be noted that this is a blend of the forming raw material when the material of the honeycomb structure body is a silicon-silicon carbide composite material. When the material of the honeycomb structure body is silicon carbide, metal silicon is not added.

The binder can include methylcellulose, hydroxypropyl methylcellulose, hydroxypropoxyl cellulose, hydroxyethylcellulose, carboxymethylcellulose, polyvinyl alcohol, and the like. Among these components, methylcellulose and hydroxypropoxyl cellulose are preferably used together. A content of the binder is preferably from 2.0 to 10.0 parts by mass, when a total mass of the silicon carbide powder and the metal silicon powder is 100 parts by mass.

A content of the water is preferably from 20 to 60 parts by mass when the total mass of the silicon carbide powder and the metal silicon powder is 100 parts by mass.

As the surfactant, ethylene glycol, dextrin, fatty acid soap, polyalcohol, and the like can be used. One of these surfactants may be used alone, or a combination of two or more of the surfactants may be used. A content of the surfactant is preferably from 0.1 to 2.0 parts by mass when the total mass of the silicon carbide powder and the metal silicon powder is 100 parts by mass.

There is not any special restriction on the pore former, as long as pores are formed after the firing, and examples of the pore former include graphite, starch, foamed resin, a water absorbable resin, and silica gel. A content of the pore former is preferably from 0.5 to 10.0 parts by mass when the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, a die may be clogged at forming. The average particle diameter of the pore former is a value measured by the laser diffraction method. In the case where the pore former is a water absorbable resin, the average particle diameter of the pore former means the average particle diameter after water absorption.

Next, the forming raw material is kneaded to form a kneaded material. There is not any special restriction on a method of kneading the forming raw material to form the kneaded material, and an example of the method can be a method in which a kneader, a vacuum pugmill, or a similar machine is used.

Next, the kneaded material is extruded to prepare a honeycomb formed structure. In the extrusion, a die having a desirable whole shape, cell shape, partition wall thickness, cell density, and the like is preferably used. A material of the die is preferably a cemented carbide that does not easily wear down. The honeycomb formed structure has a constitution having partition walls with which a plurality of cells are formed and defined to become through channels of a fluid, and a circumferential wall positioned on an outermost circumference.

The partition wall thickness, cell density, circumferential wall thickness, and the like of the honeycomb formed structure can suitably be determined in accordance with a constitution of the honeycomb structure of the present invention to be prepared, in consideration of shrinkages at drying and firing.

The obtained honeycomb formed structure is preferably dried. The honeycomb formed structure after drying may be referred to as "a dried honeycomb body." There is not any special restriction on a drying method, and examples of the method can include electromagnetic heating systems such as microwave heating drying and high-frequency dielectric heating drying, and external heating systems such as hot air drying and superheat vapor drying. In these examples, it is preferable that a predetermined amount of moisture be dried by the electromagnetic heating system, and then the remaining moisture be dried by the external heating system in that the whole formed body can immediately and evenly be dried such that any cracks are not generated. As drying conditions, it is preferable that the moisture of 30 to 99 mass % with respect to an amount of the moisture prior to the drying be removed by the electromagnetic heating system, and then the moisture be decreased to 3 mass % or less by the external heating system. The electromagnetic heating system is preferably the dielectric heating drying. The external heating system is preferably the hot air drying.

When the length of the honeycomb formed structure (the dried honeycomb body) in the central axis direction is not a desirable length, both end faces (both end portions) of the honeycomb formed structure are preferably cut such that the length is the desirable length. There is not any special restriction on a cutting method, and the cutting method can include a method using a disc saw cutter or a similar cutter.

Next, an electrode member forming raw material to form the electrode members is mixed. When the main components of the electrode members are silicon carbide and silicon, the electrode member forming raw material is preferably formed by adding predetermined additives to silicon carbide powder and silicon powder, followed by kneading.

Specifically, metal silicon powder (metal silicon), a binder, a surfactant, a pore former, water, and the like are added to the silicon carbide powder (silicon carbide), and kneaded to prepare the electrode member forming raw material. A mass of metal silicon is preferably from 20 to 40 parts by mass when a total mass of the silicon carbide powder and metal silicon is 100 parts by mass. An average particle diameter of silicon carbide particles in the silicon carbide powder is preferably from 10 to 60 µm. An average particle diameter of the metal silicon powder (metal silicon) is preferably from 2 to 20 µm. When the average particle diameter is smaller than 2 µm, an electrical resistivity excessively may decrease. When the average particle diameter is larger than 20 µm, the electrical resistivity excessively may increase. The average particle diameters of the silicon carbide particles and metal silicon (metal silicon particles) are values measured by the laser diffraction method. The silicon carbide particles are fine particles of silicon carbide constituting the silicon carbide powder. The metal silicon particles are fine particles of metal silicon constituting the metal silicon powder.

Examples of the binder can include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass when the total mass of the silicon carbide powder and the metal silicon powder is 100 parts by mass.

A content of the water is preferably from 15 to 60 parts by mass when the total mass of the silicon carbide powder and the metal silicon powder is 100 parts by mass.

As the surfactant, ethylene glycol, dextrin, fatty acid soap, polyalcohol, and the like can be used. One of these surfactants may be used alone, or a combination of two or more of the surfactants may be used. A content of the surfactant is preferably from 0.1 to 2.0 parts by mass when the total mass of the silicon carbide powder and the metal silicon powder is 100 parts by mass.

There is not any special restriction on the pore former, as long as the pores are formed after the firing, and examples of the pore former can include graphite, starch, foamed resin, a water absorbable resin, and silica gel. A content of the pore former is preferably from 0.1 to 5.0 parts by mass when the total mass of the silicon carbide powder and the metal silicon powder is 100 parts by mass. An average particle diameter of the pore former is preferably from 10 to 30 µm. When the average particle diameter is smaller than 10 µm, the pores possibly cannot sufficiently be formed. When the average particle diameter is larger than 30 µm, large pores are easily formed, possibly causing strength deterioration. The average particle diameter of the pore former is a value measured by the laser diffraction method.

Next, a mixture obtained by mixing the silicon carbide powder (silicon carbide), metal silicon (metal silicon powder), the binder, the surfactant, the pore former, the water, and the like is preferably kneaded, to obtain the paste-like electrode member forming raw material. There is not any special restriction on a kneading method, and, for example, a vertical stirrer can be used.

Next, the obtained electrode member forming raw material is preferably applied to the side surface of the dried honeycomb formed structure (the dried honeycomb body). There is not any special restriction on a method of applying the electrode member forming raw material to the side surface of the dried honeycomb body, and, for example, a printing method can be used. The electrode member forming raw material is preferably applied to the side surface of the dried honeycomb body so as to form the shape of the electrode member in the honeycomb structure of the present invention. The thickness of the electrode member can be a desirable thickness by adjusting the thickness when the electrode member forming raw material is applied. Thus, since the electrode member can be formed only by applying, drying, and firing the electrode member forming raw material to the side surface of the dried honeycomb body, allowing forming the electrode member considerably easily.

Next, the electrode member forming raw material, which is applied on the side surface of the dried honeycomb body, is preferably dried to prepare "a dried honeycomb body with electrode member raw material." A drying condition is preferably from 50 to 100° C.

Next, it is preferred that a slit is formed at the dried honeycomb body with electrode member raw material. Forming the slit with a leutor and the like is preferred. The slit is formed so as to open to the side surface of the dried honeycomb body with electrode member raw material. Then, at least one of the slits is formed so as not to intersect with the straight line connecting the center portions of the respective pair of electrode members in the cross section perpendicular to the cell extending direction. As a slit formed at the dried honeycomb body with electrode member raw material, the slit similar to the slit of the above preferable aspect formed at the honeycomb structure of the present invention is preferable. For example, it is preferred that the slits similar to the slits 6 formed at the honeycomb structure 100 illustrated in FIG. 1 be formed at the dried honeycomb body with electrode member raw material. After firing the dried honeycomb body with electrode member raw material, the slits may be formed. After forming the slits at the dried honeycomb body, the electrode member forming raw material may be applied to the dried honeycomb body.

Next, the dried honeycomb body with electrode member raw material is preferably fired to prepare a honeycomb structure. Prior to the firing, calcination is preferably performed to remove the binder and the like. The calcination is preferably performed at 400 to 500° C. in the air atmosphere for 0.5 to 20 hours.

As a firing (main firing) condition, heating is preferably performed at 1400 to 1500° C. in an inert atmosphere of nitrogen, argon, and the like for one to 20 hours. Moreover, after the firing, an oxidation treatment is preferably performed at 1200 to 1350° C. for one to ten hours to enhance durability. There is not any special restriction on calcination and firing methods, and the firing can be performed by using an electric furnace, a gas furnace, or a similar furnace.

The following describes a method for manufacturing the honeycomb structure of another embodiment of the present invention. The method for manufacturing the honeycomb structure of the present embodiment is a method for manufacturing the honeycomb structure whose slits are filled with the fillers (including the fillers), for example, a method for preparing the honeycomb structure as illustrated in any of FIG. 5 to FIG. 12.

The method for manufacturing the honeycomb structure of the present embodiment is preferred to first prepare "the dried honeycomb body with electrode member raw material" by the method similar to the method for manufacturing the honeycomb structure of an embodiment of the present invention.

In the case where a material same as the material of the electrode member is employed as the filler, it is preferred that after preparing "the dried honeycomb body with electrode member raw material", a slit be formed at the dried honeycomb body with electrode member raw material similar to the method for manufacturing the honeycomb structure of an embodiment of the present invention. Then, preparing a raw material for filler is preferred. The raw material for filler is preferred to be the similar composition as the preferred composition of the electrode member forming raw material. Next, filling the raw material for filler to the slit is preferred. When the raw material for filler is filled in the slit, using a spatula and the like is preferred. Then, drying the dried honeycomb body with electrode member raw material where the raw material for filler is filled in the slit is preferred. The drying condition is preferably from 50 to 100° C. Next, firing the dried honeycomb body with electrode member raw material after drying to obtain the honeycomb structure is preferably. For example, it is preferred to prepare the honeycomb structure like the honeycomb structure illustrated in any of FIG. 5 to FIG. 12. The firing condition is preferred to be similar to a firing condition regarded to be preferred in the method for manufacturing the honeycomb structure of an embodiment of the present invention.

As the filler, in the case where a material requiring a heating process at a temperature lower than a firing temperature of the electrode member is employed, after "the dried honeycomb body with electrode member raw material" is prepared, performing calcination and main firing to obtain "a honeycomb fired body with electrode member" is preferred. Then, forming slits at the honeycomb fired body with electrode member is preferred. Respective conditions of the calcination, main firing, and formation of the slits are preferably similar to the conditions for the method for manufacturing the honeycomb structure of an embodiment of the present invention. The raw material for filler is filled to the honeycomb fired body with electrode member at which the slits are formed, and then the raw material for filler is dried and heat processed to obtain the honeycomb structure are preferred. To fill the raw material for filler to the slit, using a spatula and the like is preferred. The raw material for filler preferably contains inorganic particles and an inorganic adhesive. Additionally, the raw material for filler preferably contains the organic binder, surfactant, foamed resin, water, and the like. The inorganic particles can include plate-like particles, spherical particles, aggregated particles, fibrous particles, acicular particles, and the like. The material of the inorganic particles can include silicon carbide, mica, talc, boron nitride, glass flake, and the like. The inorganic particles may be a mixture of a plurality kinds of inorganic particles. The inorganic particles preferably contain at least 50 mass % or more of silicon carbide particles. The inorganic adhesive can include colloidal silica ($SiO_2$ sol), colloidal alumina (alumina sol), various oxide sols, ethyl silicate, liquid glass, silica polymer, aluminum phosphate, and the like.

WORKING EXAMPLES

Hereinafter, working examples of the present invention will further specifically be described, but the present invention is not limited to these working examples.

Working Example 1

Silicon carbide (SiC) powder and metal silicon (Si) powder were mixed at a mass ratio of 80:20 to prepare silicon carbide-metal silicon mixture. To this silicon carbide-metal silicon mixture, hydroxypropyl methylcellulose as a binder and a water absorbable resin as a pore former were added, and water was added, to prepare a forming raw material. Afterward, the forming raw material was kneaded by a vacuum pugmill, to prepare a columnar kneaded material. A content of the binder was 7 parts by mass when a total of the silicon carbide (SiC) powder and the metal silicon (Si) powder was 100 parts by mass. A content of the pore former was 3 parts by mass when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 20 µm, and an average particle diameter of the metal silicon powder was 6 µm. Moreover, an average particle diameter of the pore former was 20 µm. The average particle diameters of silicon carbide, metal silicon, and the pore former were values measured by a laser diffraction method.

The obtained columnar kneaded material was formed by using an extrusion forming machine to obtain a honeycomb formed structure. The obtained honeycomb formed structure was subjected to high-frequency dielectric heating and drying. Afterward, the honeycomb formed structure was dried at 120° C. for two hours by use of a hot air drier, and both end faces of the honeycomb formed structure were cut as much as predetermined amounts.

Next, silicon carbide (SiC) powder and metal silicon (Si) powder were mixed at a mass ratio of 60:40. To this mixture, hydroxypropyl methylcellulose as a binder, glycerin as a moisture retaining agent and a surfactant as a dispersing agent were added, and water was also added, and mixed. This mixture was kneaded to prepare an electrode member forming raw material. A content of the binder was 0.5 parts by mass when a total of the silicon carbide (SiC) powder and the metal silicon (Si) powder was 100 parts by mass. A content of glycerin was 10 parts by mass when the total of the silicon carbide (SiC) powder and the metal silicon (Si) powder was 100 parts by mass. A content of the surfactant was 0.3 parts by mass when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 52 µm, and an average particle diameter of the metal silicon powder was 6 µm. The average particle diameters of silicon carbide and metal silicon were values measured by the laser diffraction method. The kneading was carried out by a vertical stirrer.

Next, the electrode member forming raw material was applied, in a band-like state, to the side surface of the dried honeycomb formed structure across both end portions (both end faces) of the honeycomb formed structure such that the thickness became 0.15 mm and "0.5 times of a central angle became 50° in a cross section perpendicular to a cell extending direction." The electrode member forming raw material was applied to two portions of the side surface of the dried honeycomb formed structure. Then, in the cross section perpendicular to the cell extending direction, one of the two portions to which the electrode member forming raw material was applied was disposed opposite to the other portion via the center of the honeycomb formed structure.

Next, the electrode member forming raw material applied to the honeycomb formed structure was dried to obtain the dried honeycomb body with electrode member raw material. A drying condition was 70° C.

Next, four slits were formed at the dried honeycomb body with electrode member raw material. The slits were formed with a leutor.

Next, the dried honeycomb body with electrode member raw material with the slits was degreased, fired, and further subjected to an oxidation treatment to obtain a honeycomb structure. Degreasing conditions were 550° C. and three hours. Firing conditions were 1450° C. and two hours in an argon atmosphere. Conditions of the oxidation treatment were 1300° C. and one hour.

Figure 15:
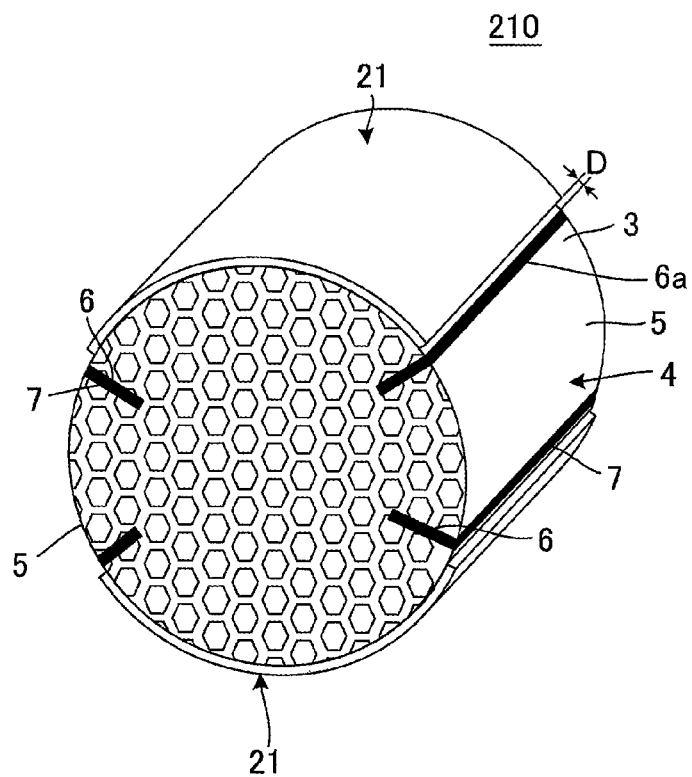
FIG. 15 is a perspective view schematically illustrating the honeycomb structure of Working Example 1.

The obtained honeycomb structure, as illustrated in FIG. 15, included a total of the four slits 6, each two slits at the two side surfaces 5 at which the electrode members 21 were not arranged. The depth of the slits was 3 mm. The width of the slits was 1 mm. The slit angle was 120°. The distance D between the electrode member 21 and "the shortest distance slit" 6a was 1 mm. In the cross section perpendicular to the cell extending direction, the slits did not intersect with "the straight line connecting the center portions of the respective pair of electrode members" (the center line). The shape of the cell in the cross section perpendicular to the cell extending direction was a hexagonal shape. FIG. 15 is a perspective view schematically illustrating a honeycomb structure 210 of Working Example 1.

An average pore diameter (an air pore diameter) of partition walls of the obtained honeycomb structure was 8.6 μm and a porosity was 45%. The average pore diameter and the porosity were values measured by a mercury porosimeter. Furthermore, a thickness of the partition walls of the honeycomb structure was 90 μm and a cell density was 90 cells/cm². Moreover, a bottom surface of the honeycomb structure had a round shape of a diameter (an outer diameter) of 93 mm. A length of the honeycomb structure in the cell extending direction was 100 mm. Additionally, 0.5 times of the central angle of the two electrode members of the honeycomb structure in the cross section perpendicular to the cell extending direction was 50°. Moreover, thicknesses of the two electrode members were both 1.5 mm. Furthermore, an electrical resistivity of the electrode member was 1.3 Ωcm, an electrical resistivity of the honeycomb structure body was 100 Ωcm. The shape of the cell in the cross section perpendicular to the cell extending direction of the honeycomb structure was a hexagonal shape.

"A thermal shock resistance test" and "a maximum temperature measurement during energization" were conducted on the obtained honeycomb structures by the following method. The results are shown in Table 1.

The electrical resistivities of the honeycomb structure body and the electrode member were measured by the following method. A test piece of 10 mm×10 mm×50 mm was created using the same material as that of an object to be measured. That is, when the electrical resistivity of the honeycomb structure body was measured, the same material as that of the honeycomb structure body was used, and when the electrical resistivity of the electrode member was measured, the same material as that of the electrode member was used, for preparing the test pieces, respectively. All surfaces of both end portions of the test pieces were applied with a silver paste, and provided with a wiring line, thus enabling energization. A voltage applying current measuring device was coupled to the test piece. A thermocouple was disposed in the center portion of the test piece. A voltage was applied to the test piece, and a change of a temperature of the test piece with an elapse of time when applying the voltage was checked by a recorder. More specifically, a voltage of 100 to 200 V was applied, and a current value and a voltage value were measured in a state where the temperature of the test piece was 400° C. The electrical resistivity was calculated from the obtained current value and voltage value, and a test piece dimension.

(Thermal Shock Resistance Test)

A heating cooling test was conducted on the honeycomb structure using a "propane gas burner test machine, which includes a metal case which houses the honeycomb structure, and a propane gas burner, which can supply heated gas to the inside of the metal case."The heated gas was combustion gas generated by burning the propane gas with a gas burner (a propane gas burner). In the heating cooling test, the thermal shock resistance was evaluated by confirming whether a crack was generated in the honeycomb structure or not. Specifically, first, the obtained honeycomb structure was housed (canning) in the metal case of the propane gas burner test machine. Then, in the metal case, the gas (the combustion gas) heated by the propane gas burner was supplied so as to pass through the inside of the honeycomb structure. A temperature condition (an inlet gas temperature condition) of the heated gas flown into the metal case was set as follows. First, the temperature of the gas was raised to a specified temperature in five minutes, held at the specified temperature for ten minutes, cooled to 100° C. in five minutes, and finally held at 100° C. for ten minutes. Such sequence of operations of temperature rise, cooling, and holding is referred to as "temperature rise and cooling operations." Afterwards, the honeycomb structure was checked for crack. Then, while rising the specified temperature from 825° C. by 25° C., "the temperature rise and cooling operations" were repeated. The specified temperature was set in ten phases from 825° C. by 25° C. That is, "the temperature rise and cooling operations" were performed until the specified temperature became 1050° C. The higher the specified temperature is, the larger a steepness of the temperature rise. Delaying the temperature rise at the outer circumference portion with respect to the center portion expands a temperature difference between the center portion and the outer circumference portion, thus increasing stress to be generated. When the honeycomb structure does not generate a crack until the specified temperature exceeds 900° C., the honeycomb structure passes the thermal shock resistance test. That is, when a crack does not occur at the specified temperature, 900° C., the honeycomb structure passes the test even if a crack occurs at a higher specified temperature, and fails the test if a crack occurs at the specified temperature of 900° C. or less. In Table 1, the column of "Thermal shock resistance test" indicates the specified temperature when a crack occurs in the honeycomb structure in the thermal shock resistance test.

(Maximum Temperature Measurement During Energization)

First, a voltage of 200 V was applied to the honeycomb structure to carry out an energization test. Then, the highest temperature of the honeycomb structure at this time was measured. Specifically, when the 200V-voltage was applied to the honeycomb structure, a temperature at "a position at which the end portion of the electrode member (the end portion in the circumferential direction) was in contact with in the cross section perpendicular to the cell extending direction" of the honeycomb structure body was measured. Then, when the 200V-voltage was applied to the honeycomb structure, a temperature at "a position at which a center point of the electrode member in the circumferential direction was in contact with in the cross section perpendicular to the cell extending direction" of the honeycomb structure body was measured. The highest temperature among the measured temperatures was set as a maximum temperature. Any of the position at which the end portion of the electrode member (the end portion in the circumferential direction) in contact with or the position at which the center point of the electrode member in the circumferential direction in contact with at the honeycomb structure body is a position at which a current flows most and is a part with the highest temperature in the honeycomb structure. Thus, heat generation deviation of the honeycomb structure was evaluated. If the maximum temperature of the honeycomb structure is 200° C. or less, it can be said that the deviation in the temperature distribution of the honeycomb structure is controlled and the honeycomb structure passes the test.

TABLE 1

| | Electrode member 0.5 times of central angle (°) | Honeycomb structure body | | | | | | | | Filler | | | Evaluation | |
|---|---|---|---|---|---|---|---|---|---|---|---|---|---|---|
| | | Outer diameter | Presence or absence of slit | Slit depth (mm) | Slit width (mm) | No. of slits (piece) | Maximum slit angle | Distance of slit from electrode (mm) | Presence or absence of intersection of slit with center line | Presence or absence of filler | Young's modulus of filler (GPa) | Porosity of filler (%) | Thermal shock resistance test (° C.) | Maximum temperature during energization (° C.) |
| Working Example 1 | 50 | 93 | Yes | 3 | 1 | 4 | 120 | 1 | No | No | — | — | 1050 | 180 |
| Working Example 2 | 50 | 93 | Yes | 3 | 1 | 4 | 120 | 10 | No | No | — | — | 1000 | 160 |
| Working Example 3 | 50 | 93 | Yes | 3 | 1 | 4 | 120 | 20 | No | No | — | — | 975 | 155 |
| Working Example 4 | 50 | 93 | Yes | 6 | 1 | 4 | 120 | 10 | No | No | — | — | 1000 | 160 |
| Working Example 5 | 50 | 93 | Yes | 9 | 1 | 4 | 120 | 10 | No | No | — | — | 1025 | 160 |
| Working Example 6 | 50 | 93 | Yes | 3 | 2 | 4 | 120 | 10 | No | No | — | — | 1000 | 160 |
| Working Example 7 | 50 | 93 | Yes | 3 | 1 | 6 | 120 | 10 | No | No | — | — | 1000 | 160 |
| Working Example 8 | 50 | 93 | Yes | 3 | 1 | 8 | 120 | 10 | No | No | — | — | 1025 | 160 |
| Working Example 9 | 50 | 93 | Yes | 3 | 1 | 4 | 60 | 10 | No | No | — | — | 950 | 160 |
| Working Example 10 | 50 | 93 | Yes | 3 | 1 | 4 | 90 | 10 | No | No | — | — | 925 | 160 |
| Working Example 11 | 50 | 93 | Yes | 3 | 1 | 4 | 120 | 10 | No | Yes | 0.1 | 80 | 975 | 160 |
| Working Example 12 | 50 | 93 | Yes | 3 | 1 | 4 | 120 | 10 | No | Yes | 0.5 | 65 | 975 | 158 |
| Working Example 13 | 50 | 93 | Yes | 3 | 1 | 4 | 120 | 10 | No | Yes | 5 | 55 | 950 | 156 |
| Working Example 14 | 50 | 93 | Yes | 3 | 1 | 4 | 120 | 10 | No | Yes | 15 | 52 | 925 | 153 |
| Working Example 15 | 50 | 93 | Yes | 3 | 1 | 4 | 120 | 10 | No | Yes | 20 | 48 | 900 | 150 |
| Comparative Example 1 | 50 | 93 | No | — | — | — | — | — | — | No | — | — | 825 | 150 |
| Comparative Example 2 | 50 | 93 | Yes | 40 | 1 | 4 | 90 | 1 | Yes | No | — | — | 950 | 250 |

Working Examples 2 to 10, Comparative Examples 1 and 2

Except that respective conditions are changed as shown in Table 1, the honeycomb structures were prepared similar to Working Example 1. Similar to Working Example 1, "the thermal shock resistance test" and "the maximum temperature measurement during energization" were conducted. The results are shown in Table 1.

Working Examples 11 to 15

Except that the distance D between the electrode member 21 and "the shortest distance slit" 6a was set to 10 mm, similar to Working Example 1, "the dried honeycomb bodies with electrode member raw material with slits" were prepared. The raw materials for filler were filled to "the dried honeycomb bodies with electrode member raw material with slits" using a spatula to obtain "the dried honeycomb bodies with the raw material for filler." Afterwards, "the dried honeycomb bodies with the raw material for filler" were dried at 70° C., and then were degreased and fired similar to Working Example 1, thus obtaining the honeycomb structures whose values of Young's modulus and porosities of the filler were as shown in Table 1. The raw material for filler had the same composition as the composition of the electrode member forming raw material. Similar to working example 1, "the thermal shock resistance test" and "the maximum temperature measurement during energization" were conducted. The results are shown in Table 1.

"The Young's modulus of the filler" is a value measured by a bending resonance method in conformity to JIS R1602. A rest piece employed for the measurement was prepared by the following method. First, bulk body was prepared using a raw material forming the filler. Cutting this bulk bodies into a size of 3 mm×4 mm×40 mm was employed as the test piece. The porosity of the filler is a value measured by a mercury porosimeter.

It can be seen from Table 1 that the honeycomb structures with the slits are excellent in thermal shock resistance, and also the maximum temperature during energization is low.

INDUSTRIAL APPLICABILITY

A honeycomb structure of the present invention can suitably be utilized as a catalyst carrier for an exhaust gas purifying device that purifies an exhaust gas of a car.

DESCRIPTION OF REFERENCE NUMERALS

1: partition wall, 2: cell, 3: circumferential wall, 4: honeycomb structure body, 5: side surface, 6: slit, 6a: shortest distance slit, 7: filler, 11: one end face, 12: other end face, 21: electrode member, 22: slit, 23: terminal, 100, 110, 120, 130, 140, 150, 160, 170, 180, 190, 200, 210, 220, 230: honeycomb structure, O: center, C: center portion (of electrode member), L: center line, L1, L2: line segment, α: central angle, β: angle, θ: angle of 0.5 times of central angle, A, B: region, D: distance, P: point (end point), SA: slit angle, HL: half line.

The invention claimed is:

1. A honeycomb structure, comprising:
   a porous partition wall that defines and forms a plurality of cells, the plurality of cells extending from one end face to another end face to become through channels of a fluid;
   a tubular honeycomb structure body that includes a circumferential wall positioned at an outermost circumference; and
   a pair of electrode members arranged at a side surface of the honeycomb structure body, wherein
   the honeycomb structure body has an electrical resistivity of 1 to 200 Ωcm,
   the respective pair of electrode members are formed into a band-like shape extending in a direction in which the cells of the honeycomb structure body extend,
   in a cross section perpendicular to the cell extending direction, one of the electrode members in the pair of electrode members is arranged opposite to another of the electrode members in the pair of electrode members sandwiching a center of the honeycomb structure body,
   one or more of slits are formed at the honeycomb structure body, the slit being open to a side surface, and
   at least the one slit is formed so as not to intersect with a straight line connecting center portions of the respective pair of electrode members in the cross section perpendicular to the cell extending direction.

2. The honeycomb structure according to claim 1, wherein the honeycomb structure body includes two or more of the slits, and
   50% or more of slits among the two or more slits are formed so as not to intersect with the straight line connecting the center portions of the respective pair of electrode members in the cross section perpendicular to the cell extending direction.

3. The honeycomb structure according to claim 2, wherein all the slits formed at the honeycomb structure body are formed so as not to intersect with the straight line connecting the center portions of the respective pair of electrode members in the cross section perpendicular to the cell extending direction.

4. The honeycomb structure according to claim 1, further comprising
   a filler filled in at least one of the slits is provided, wherein the filler is filled to at least some spaces of the slits.

5. The honeycomb structure according to claim 2, further comprising
   a filler filled in at least one of the slits is provided, wherein the filler is filled to at least some spaces of the slits.

6. The honeycomb structure according to claim 3, further comprising
   a filler filled in at least one of the slits is provided, wherein the filler is filled to at least some spaces of the slits.

7. The honeycomb structure according to claim 4, wherein
   two or more of the slits are formed at the honeycomb structure body, and
   a filler is filled to a slit 50% or more of the two or more slits.

8. The honeycomb structure according to claim 5, wherein
   two or more of the slits are formed at the honeycomb structure body, and
   a filler is filled to a slit 50% or more of the two or more slits.

9. The honeycomb structure according to claim 6, wherein
   two or more of the slits are formed at the honeycomb structure body, and
   a filler is filled to a slit 50% or more of the two or more slits.

10. The honeycomb structure according to claim 7, further comprising
    fillers filled to all of two or more of the slits formed at the honeycomb structure body.

11. The honeycomb structure according to claim 8, further comprising
    fillers filled to all of two or more of the slits formed at the honeycomb structure body.

12. The honeycomb structure according to claim 9, further comprising
    fillers filled to all of two or more of the slits formed at the honeycomb structure body.

13. The honeycomb structure according to claim 4, wherein
    the fillers are filled to all spaces in the slit.

14. The honeycomb structure according to claim 7, wherein
    the fillers are filled to all spaces in the slit.

15. The honeycomb structure according to claim 10, wherein
    the fillers are filled to all spaces in the slit.

* * * * *